(12) United States Patent
Sayana et al.

(10) Patent No.: US 9,912,430 B2
(45) Date of Patent: Mar. 6, 2018

(54) METHOD AND APPARATUS FOR CHANNEL STATE INFORMATION FEEDBACK REPORTING

(71) Applicant: Samsung Electronics Co., LTD, Suwon-si, Gyeonggi-do (KR)

(72) Inventors: Krishna Sayana, San Jose, CA (US); Younsun Kim, Seongnam-si (KR); Hyojin Lee, Seoul (KR); Young-Han Nam, Richardson, TX (US); Jin-Kyu Han, Allen, TX (US)

(73) Assignee: Samsung Electronics Co. Ltd., Suwon-si, Gyeonggi-do (KR)

( * ) Notice: Subject to any disclaimer, the term of this patent is extended or adjusted under 35 U.S.C. 154(b) by 255 days.

(21) Appl. No.: 13/935,711

(22) Filed: Jul. 5, 2013

(65) Prior Publication Data
US 2014/0010126 A1 Jan. 9, 2014

Related U.S. Application Data

(60) Provisional application No. 61/668,900, filed on Jul. 6, 2012, provisional application No. 61/683,628, filed on Aug. 15, 2012.

(51) Int. Cl.
*H04J 3/16* (2006.01)
*H04B 7/06* (2006.01)
(Continued)

(52) U.S. Cl.
CPC .......... *H04J 3/1694* (2013.01); *H04B 7/0619* (2013.01); *H04B 7/0626* (2013.01);
(Continued)

(58) Field of Classification Search
None
See application file for complete search history.

(56) References Cited

U.S. PATENT DOCUMENTS

2010/0062783 A1   3/2010  Luo et al.
2011/0317748 A1*  12/2011 Li ................... H04B 7/0417
                                                   375/219
(Continued)

FOREIGN PATENT DOCUMENTS

CN     102237968 A    11/2011
KR    20100098728 A    9/2010
(Continued)

OTHER PUBLICATIONS

International Search Report dated Oct. 21, 2013 in connection with International Patent Application No. PCT/KR2013/006069, 3 pages.
(Continued)

*Primary Examiner* — Charles C Jiang
*Assistant Examiner* — George Atkins, Jr.

(57) ABSTRACT

A method for transmitting a CSI feedback report to a serving cell comprises for time division duplex, configuring at least one periodic CSI process with a CSI reference source defined by a single downlink subframe $n-n_{CQI\_ref}$, wherein $n_{CQI\_ref}$ is a smallest value greater than or equal to a positive integer $n_{CQI\_ref\_min}$, such that it corresponds to a valid downlink subframe, wherein $n_{CQI\_ref\_min}$ varies based on a number of at least one periodic CSI process. A method for CSI feedback reporting to a base station comprises configuring not to accommodate, by a user equipment, the one or more aperiodic CSI requests arrived from a serving cell except a CSI request of CSI processes with lower indexes for each serving cell, wherein a number of the one or more CSI processes with a lower index (es) is determined based on a number of pending CSI reports.

19 Claims, 11 Drawing Sheets

(51) Int. Cl.
*H04L 5/00* (2006.01)
*H04L 5/14* (2006.01)
*H04B 7/0456* (2017.01)
*H04L 1/00* (2006.01)

(52) U.S. Cl.
CPC ............ *H04L 5/001* (2013.01); *H04L 5/0035* (2013.01); *H04L 5/0057* (2013.01); *H04L 5/1469* (2013.01); *H04B 7/0456* (2013.01); *H04B 7/0617* (2013.01); *H04L 1/0026* (2013.01); *H04L 5/0023* (2013.01)

(56) References Cited

U.S. PATENT DOCUMENTS

| | | | | |
|---|---|---|---|---|
| 2012/0082049 | A1* | 4/2012 | Chen | H04W 24/10 370/252 |
| 2013/0142163 | A1* | 6/2013 | Liu | H04L 1/0026 370/329 |
| 2013/0258874 | A1* | 10/2013 | Khoshnevis | H04L 5/0057 370/252 |
| 2013/0258965 | A1* | 10/2013 | Geirhofer | H04W 72/048 370/329 |
| 2013/0286933 | A1* | 10/2013 | Lee | H04L 1/0026 370/315 |
| 2013/0322376 | A1* | 12/2013 | Marinier | H04W 72/06 370/329 |
| 2013/0336214 | A1 | 12/2013 | Sayana et al. | |
| 2014/0078919 | A1* | 3/2014 | Hammarwall | H04L 5/0057 370/252 |
| 2015/0009928 | A1* | 1/2015 | Sohn | H04L 1/0026 370/329 |

FOREIGN PATENT DOCUMENTS

| | | |
|---|---|---|
| RU | 2010143358 A | 4/2012 |
| WO | WO 2011/153286 A1 | 12/2011 |
| WO | WO 2012/047842 A1 | 4/2012 |
| WO | 2013169197 A1 | 11/2013 |
| WO | WO2013191441 A1 | 12/2013 |

OTHER PUBLICATIONS

Translated Korean Office Action dated Oct. 2, 2015 in connection with Korean Patent Application No. 10-2015-7000158; 10 pages.
Extended European Search Report issued for EP 13812509.1 dated Feb. 15, 2016, 8 pgs.
Texas Instruments et al., "CQI Reference Resoure in the Time Domain", R1-084036, 3GPP TSG RAN WG1 54bis, Oct. 6, 2006, 3 pgs.
Texas Instruments, "CSI Reporting Based on Restricted Measurements in Rel-10", R1-110263, 3GPP TSG RAN WG1 #63bis, Jan. 12, 2011, 7 pgs.
"Email Discussion [69-11]: FFS Aspects of Aperiodic CSI Feedback for CoMP," 3GPP TSG RAN WG1 Meeting #69, Fujitsu, R1-122931, Prague, Czech Republic, May 21-25, 2012, 22 pages.
LTE; Evolved Universal Terrestrial Radio Access (E-UTRA); Physical Layer Procedures (3GPP TS 36.213 Version 8.8.0 Release 8) ETSI TS 136 213 V8.8.0, Oct. 2009, 79 pages.
Foreign Communication From a Related Counterpart Application, Australian Application No. 2013285681, Examination Report No. 2 for Standard Patent Application dated Jan. 6, 2017, 8 pages.
"Restriction on CSI Management and Feedback for CoMP," 3GP TSG RAN WG #70, R1-123460, Samsung, Qingdao, China, Aug. 13-17, 2012, 4 pages.
Foreign Communication From a Related Counterpart Application, Russian Application No. 2014152985, Notification on Violation of Unity Requirement dated Mar. 29, 2017, 10 pages.
Foreign Communication From a Related Counterpart Application, Japanese Application No. 2015-520074, Notice of Reasons for Refusal dated May 22, 2017, 8 pages.
Chinese Office Action for Chinese Application No. 201380046306.4, dated Aug. 21, 2017. (16 pages).

* cited by examiner

METHOD AND APPARATUS FOR CHANNEL STATE INFORMATION FEEDBACK REPORTING

CROSS-REFERENCE TO RELATED APPLICATION(S) AND CLAIM OF PRIORITY

The present application claims priority to U.S. Provisional Patent Application Ser. No. 61/668,900, filed Jul. 6, 2012, entitled "METHODS OF CSI REPORTING WITH MULTIPLE CSI CONFIGURATIONS" and U.S. Provisional Patent Application Ser. No. 61/683,628, filed Aug. 15, 2012, entitled "METHODS OF CSI REPORTING WITH MULTIPLE CSI CONFIGURATIONS." The content of the above-identified patent documents is incorporated herein by reference.

TECHNICAL FIELD

The present application relates generally to Coordinated Multi-Point (CoMP) communication and, more specifically, to channel state information (CSI) feedback for CoMP communication.

BACKGROUND

CoMP technology has been standardized to allow the user equipment (UE) to receive signals from multiple transmission points (TPs) in different usage scenarios. The different scenarios include: 1) a homogeneous network with intra-site CoMP; 2) a homogeneous network with high transmit (Tx) power remote radio heads (RRHs); 3) a heterogeneous network with low-power RRHs within the macro cell coverage where the transmission/reception points created by the RRHs have different cell identifiers (IDs) from the macro cell; and 4) a heterogeneous network with low power RRHs within the macro cell coverage where the transmission/reception points created by the RRHs have the same cell IDs as the macro cell. The CoMP communication schemes that have been identified as the focus for standardization are joint transmission (JT); dynamic point selection (DPS), including dynamic point blanking; and coordinated scheduling/beamforming, including dynamic point blanking. Furthermore, the description of the CoMP usage scenarios is included in 3GPP TS 36.819, which is incorporated by reference herein.

SUMMARY

A method for transmitting channel state information (CSI) feedback report to a serving cell is provided. The method includes for time division duplex (TDD), configuring at least one periodic CSI process with a CSI reference source defined by a single downlink subframe $n-n_{CQI\_ref}$, wherein $n_{CQI\_ref}$ is a smallest value greater than or equal to a positive integer $n_{CQI\_ref\_min}$, such that it corresponds to a valid downlink subframe, wherein $n_{CQI\_ref\_min}$ varies based on a number of at least one periodic CSI process.

An apparatus for channel state information (CSI) feedback report to a base station is provided. The apparatus includes a controller configured to, for TDD, configure at least one periodic CSI process with a CSI reference source defined by a single downlink subframe $n-n_{CQI\_ref}$, wherein $n_{CQI\_ref}$ is a smallest value greater than or equal to a positive integer $n_{CQI\_ref\_min}$, such that it corresponds to a valid downlink subframe, wherein $n_{CQI\_ref\_min}$ varies based on a number of at least one periodic CSI process.

A method for receiving channel state information (CSI) feedback report from a user equipment (UE) is provided. The method includes, for time division duplex (TDD), configuring at least one periodic CSI process with a CSI reference source defined by a single downlink subframe $n-n_{CQI\_ref\_min}$, wherein $n_{CQI\_ref}$ is a smallest value greater than or equal to a positive integer $n_{CQI\_ref\_min}$, such that it corresponds to a valid downlink subframe, wherein $n_{CQI\_ref\_min}$ varies based on a number of at least one periodic CSI process.

An apparatus method for receiving channel state information (CSI) feedback report from a user equipment (UE) is provided. The apparatus includes a controller configured to, time division duplex (TDD), configure at least one periodic CSI process with a CSI reference source defined by a single downlink subframe $n-n_{CQI\_ref}$, wherein $n_{CQI\_ref}$ is a smallest value greater than or equal to a positive integer $n_{CQI\_ref\_min}$, such that it corresponds to a valid downlink subframe, wherein $n_{CQI\_ref\_min}$ varies based on a number of at least one periodic CSI process.

A method for channel state information (CSI) feedback reporting to a base station is provided. The method includes configuring not to accommodate, by a user equipment (UE), the one or more aperiodic CSI requests arrived from a serving cell except a CSI request of CSI processes with lower indexes for each serving cell, wherein a number of the one or more CSI processes with lower indexes is determined based on a number of pending CSI reports.

An apparatus for receiving channel state information (CSI) feedback report from a serving cell is provided. The apparatus includes a controller configured not to accommodate, by a user equipment (UE), the one or more aperiodic CSI requests arrived from a serving cell except a CSI request of CSI processes with the lowest indexes for each serving cell, wherein a number of the one or more CSI processes with the lowest indexes is determined based on a number of pending CSI reports.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following standards documents are incorporated by reference herein: 1) 3GPP TS 36.211 v10.1.0, "E-UTRA, Physical channels and modulation" (REF1); 2) 3GPP TS 36.212 v10.1.0, "E-UTRA, Multiplexing and Channel coding" (REF2); 3) 3GPP TS 36.213 v10.1.0, "E-UTRA, Physical Layer Procedures" (REF3); 4) RP-111365 Coordinated Multi-Point Operation for LTE WID; and 5) 3GPP TR 36.819 V11.0.0 (2011-09) (REF4).

Figure 1:
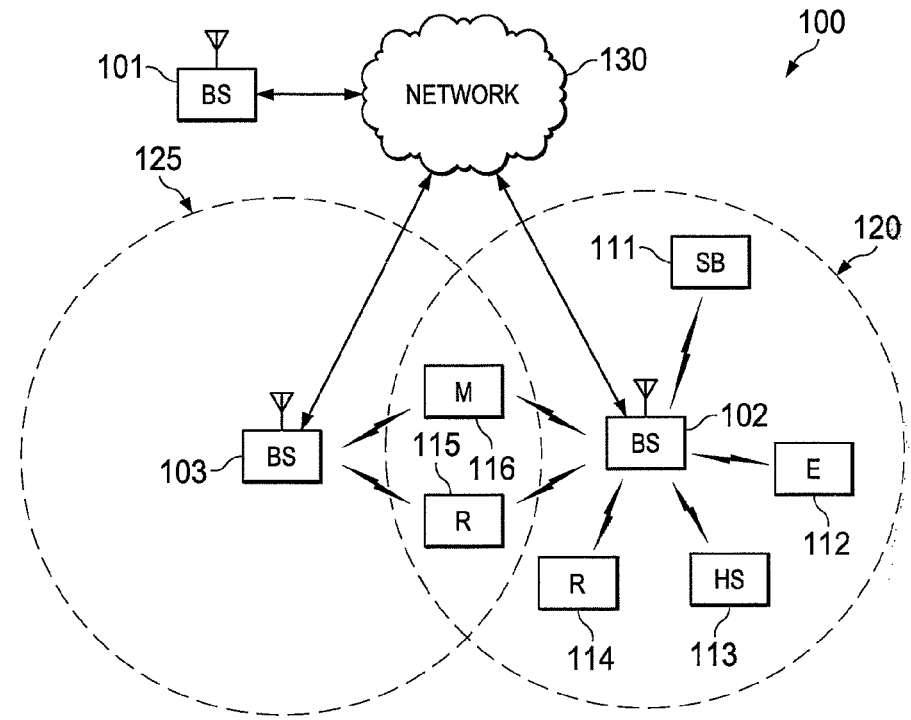
FIG. 1 illustrates an exemplary wireless system that transmits messages in accordance with embodiments of the present disclosure.
Figure 2:
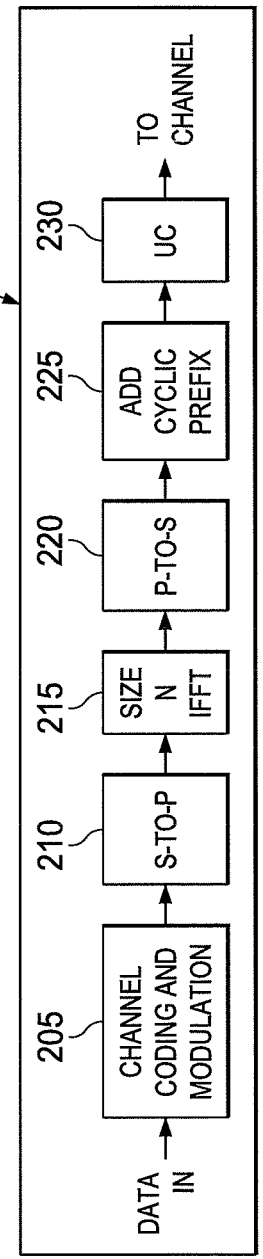
FIG. 2 illustrates a high-level diagram of an orthogonal frequency division multiple access transmit path in accordance with embodiments of the present disclosure.
Figure 3:
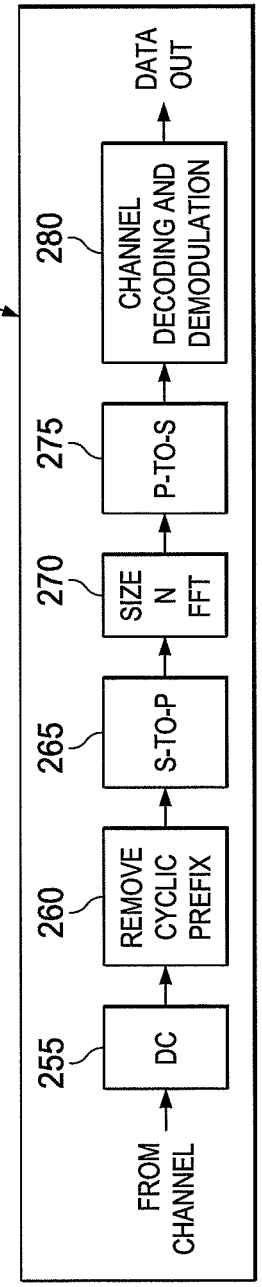
FIG. 3 illustrates a high-level diagram of an orthogonal frequency division multiple access receive path in accordance with embodiments of the present disclosure.

FIGS. 1-3 below describe various embodiments implemented in wireless communication systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with network 130 or a similar IP-based system (not shown).

Base station 102 provides wireless broadband access (via base station 101) to network 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Depending on the network type, other well-known terms may be used instead of "base station," such as "eNodeB" or "access point". For the sake of convenience, the term "base station" shall be used herein to refer to the network infrastructure components that provide wireless access to remote terminals. In addition, the term "user equipment" or "UE" is used herein to designate any remote wireless equipment that wirelessly accesses a base station and that can be used by a consumer to access services via the wireless communications network, whether the UE is a mobile device (e.g., cell phone) or is normally considered a stationary device (e.g., desktop personal computer, vending machine, etc.). Other well know terms for the remote terminals include "mobile stations" (MS) and "subscriber stations" (SS), "remote terminal" (RT), "wireless terminal" (WT), and the like.

Base station 103 provides wireless broadband access (via base station 101) to network 130 to a second plurality of UEs within coverage area 125 of base station 103. The second plurality of UEs includes UE 115 and UE 116. In an exemplary embodiment, base stations 101-103 may communicate with each other and with UEs 111-116 using OFDM or OFDMA techniques. In some embodiments, one or more of base stations 101-103 may communicate with each other and with UEs 111-116 using 5G, LTE, LTE-A, or WiMAX techniques including techniques for: channel state information feedback reporting as described in embodiments of the present disclosure.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via network 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UEs 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a UE (e.g., UE 116 of FIG. 1). In other examples, for uplink communication, the receive path circuitry 300 may be implemented in a base station (e.g., base station 102 of FIG. 1) or a relay station, and the transmit path circuitry 200 may be implemented in a UE (e.g., UE 116 of FIG. 1). In certain embodiments, transmit path 200 and receive path 300 are configured to perform methods channel state information feedback reporting as described in embodiments of the present disclosure.

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

Figure 4:
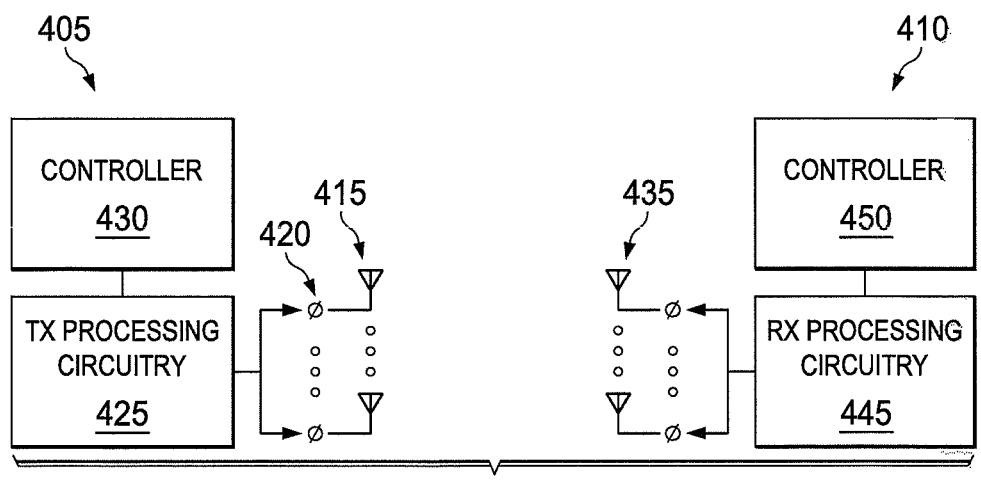
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that can be used to implement various embodiments of the present disclosure. The embodiment of the transmitter 405 and receiver 410 shown in FIG. 4 is for illustration only. Other embodiments could be used without departing from the scope of this disclosure.

In this illustrative example, the transmitter 405 and the receiver 410 are devices at a communication point in a wireless communication system, such as, for example, wireless system 100 in FIG. 1. In some embodiments, the transmitter 405 or the receiver 410 is a network entity, such as a base station, e.g., an evolved node B (eNB), a remote-radio head, a relay station, an underlay base station; a gateway (GW); or a base station controller (BSC). In other embodiments, the transmitter 405 or the receiver 410 is a UE (e.g., mobile station, subscriber station, etc.). In one example, the transmitter 405 or the receiver 410 is an example of one embodiment of the UE 116 in FIG. 1. In another example, the transmitter 405 or the receiver 410 is an example of one embodiment of the base station 102 in FIG. 1.

The transmitter 405 comprises antenna(s) 415, phase shifters 420, Tx processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via transmitter 405. For example, the Tx processing circuitry 425 can implement a transmit path that is analogous to the transmit processing circuitry 200 in FIG. 2. Transmitter 405 also can perform spatial multiplexing via layer mapping to different antennas in antenna(s) 415 to transmit signals in multiple different beams. The controller 430 controls the overall operation of transmitter 405. In one such operation, controller 430 controls the transmission of signals by the transmitter 405 in accordance with well-known principles.

Receiver 410 receives from antenna(s) 435, an incoming RF signal or signals transmitted by one or more transmission points, such as base stations, relay stations, remote radio heads, UEs, and the like. Receiver 410 includes Rx processing circuitry 445 that processes the received signal(s) to identify the information transmitted by the transmission point(s). For example, the Rx processing circuitry 445 may down-convert the incoming RF signal(s) to produce an intermediate frequency (IF) or a baseband signal by channel estimating, demodulating, stream separating, filtering, decoding, and/or digitizing the received signal(s). For example, the Rx processing circuitry 445 can implement a receive path that is analogous to the receive processing circuitry 300 in FIG. 3. The controller 450 controls the overall operation of the receiver 410. In one such operation, the controller 450 controls the reception of signals by the receiver 410 in accordance with well-known principles.

In various embodiments, the transmitter 405 is located within a TP, and the receiver is located within a UE in a CoMP communication system. For example, in the CoMP communication, multiple TPs can include transmitters similar to the transmitter 405 that transmits to the UE. The multiple TPs can be any combination of base stations (e.g., eNB, macro base stations, etc.), RRHs, and/or underlay base stations (e.g., micro base stations, relay stations, etc.).

The illustration of transmitter 405 and receiver 410 illustrated in FIG. 4 is for the purposes of illustrating one embodiment in which embodiments of the present disclosure can be implemented. Other embodiments of the transmitter 405 and the receiver 410 can be used without departing from the scope of this disclosure. For example, the transmitter 405 can be located in a communication node (e.g., BS, UE, RS, and RRH) that also includes a receiver, such as receiver 410. Similarly, the receiver 410 can be located in a communication node (e.g., BS, UE, RS, and RRH) that also includes a transmitter, such as transmitter 405. Antennas in the Tx and Rx antenna arrays in this communication node can overlap or be the same antenna arrays used for transmission and reception via one or more antenna switching mechanisms.

Figure 5:
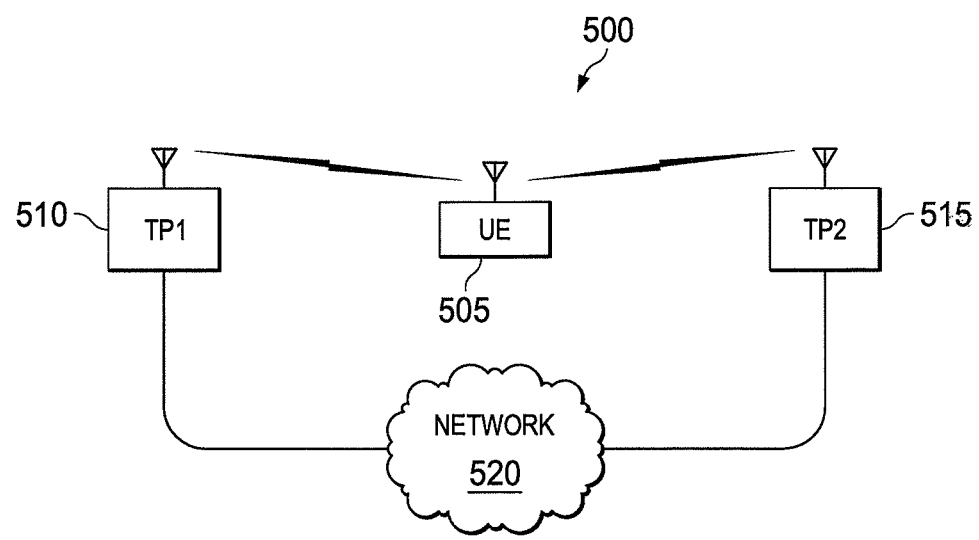
FIG. 5 illustrates a block diagram of a CoMP communication system in accordance with embodiments of the present disclosure.

FIG. 5 illustrates a block diagram of a CoMP communication system 500 in accordance with various embodiments of the present disclosure. The embodiment of the CoMP communication system 500 shown in FIG. 5 is for illustration only. Other embodiments could be used without departing from the scope of the present disclosure.

In this illustrative example, the CoMP communication system 500 includes a UE 505 and two TPs 510 and 515. For example, the UE 505 can include a receiver and transmitter as illustrated in FIG. 4. The TPs 510 and 515 also can include a receiver and transmitter as illustrated in FIG. 4. The TPs 510 and 515 can be any combination of base stations (e.g., eNB, macro base stations, etc.), RRHs, and/or underlay base stations (e.g., micro base stations, relay stations, etc.). Additionally, other TPs and UEs can be present in the CoMP communication system 500. For example, more than two TPs can communicate with the same UE 505.

The TPs 510 and 515 are connected to a network 520. For example, the TPs 510 and 515 can be connected by a wire line and/or fiber optical network. The network 520 provides connections between the TPs 510 and 515 to provide data and control information for wireless communication between the TPs 510 and 515 and the UE 505. The network 520 performs scheduling for wireless communications in the CoMP communication system 500. For example, the network 520 can include one or more gateways; or base station controllers. In one example, the network 520 can be one embodiment of the network 130 in FIG. 1.

Figure 6A:
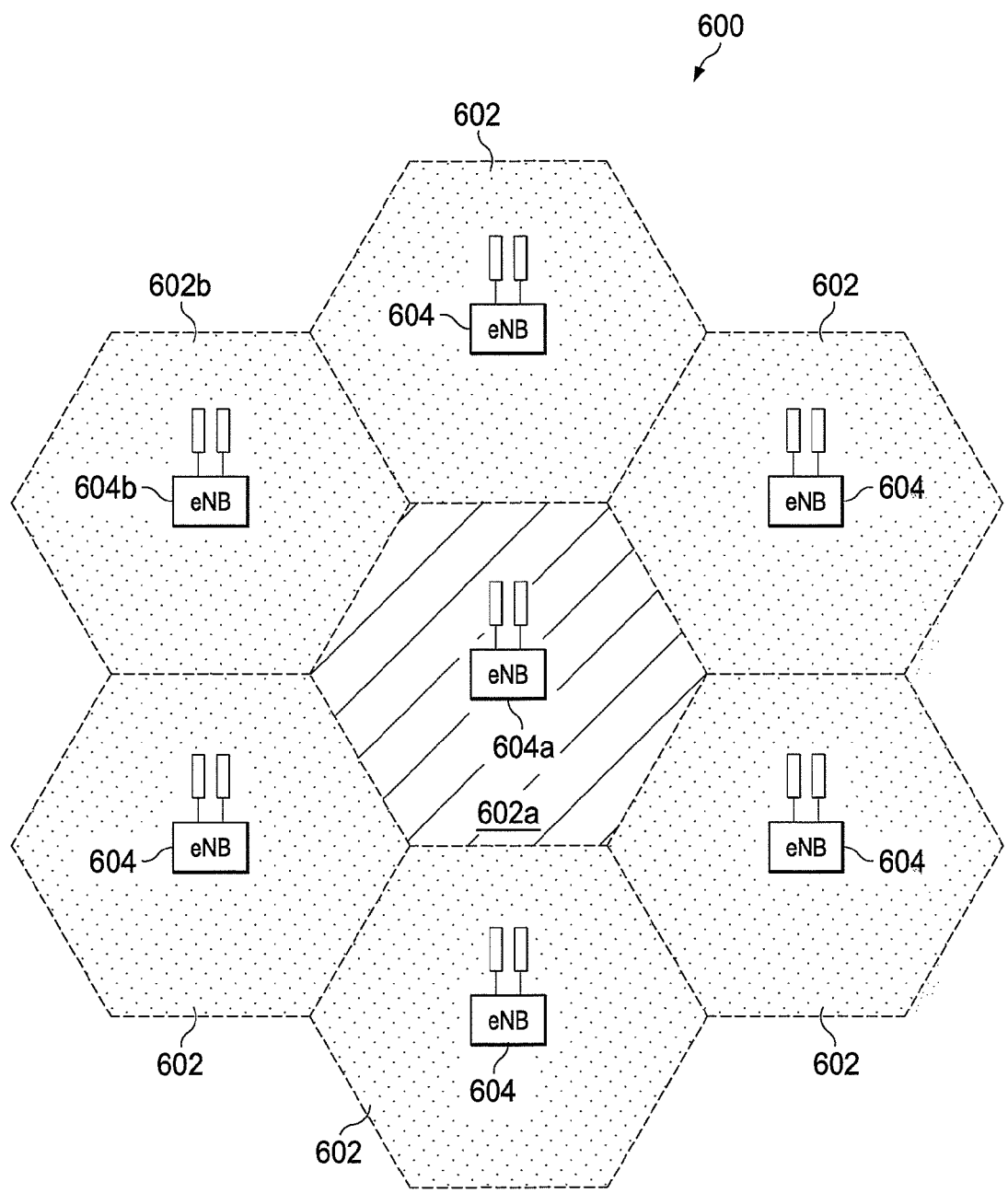
FIGS. 6A, 6B and 6C are high level diagrams illustrating a network within which CSI feedback for coordinated multipoint transmission may be implemented according to embodiments of the present disclosure.
Figure 6B:
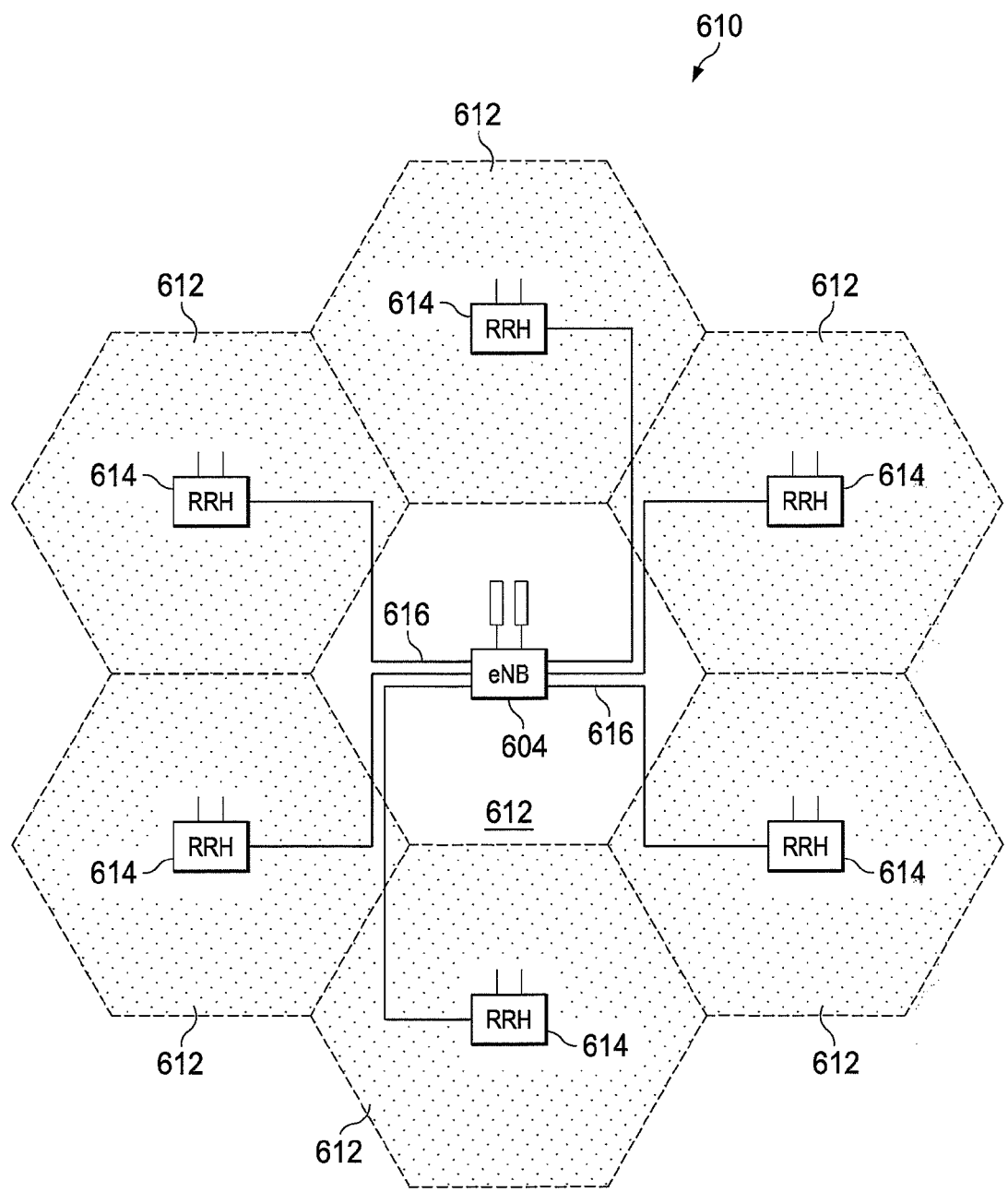
Figure 6C:
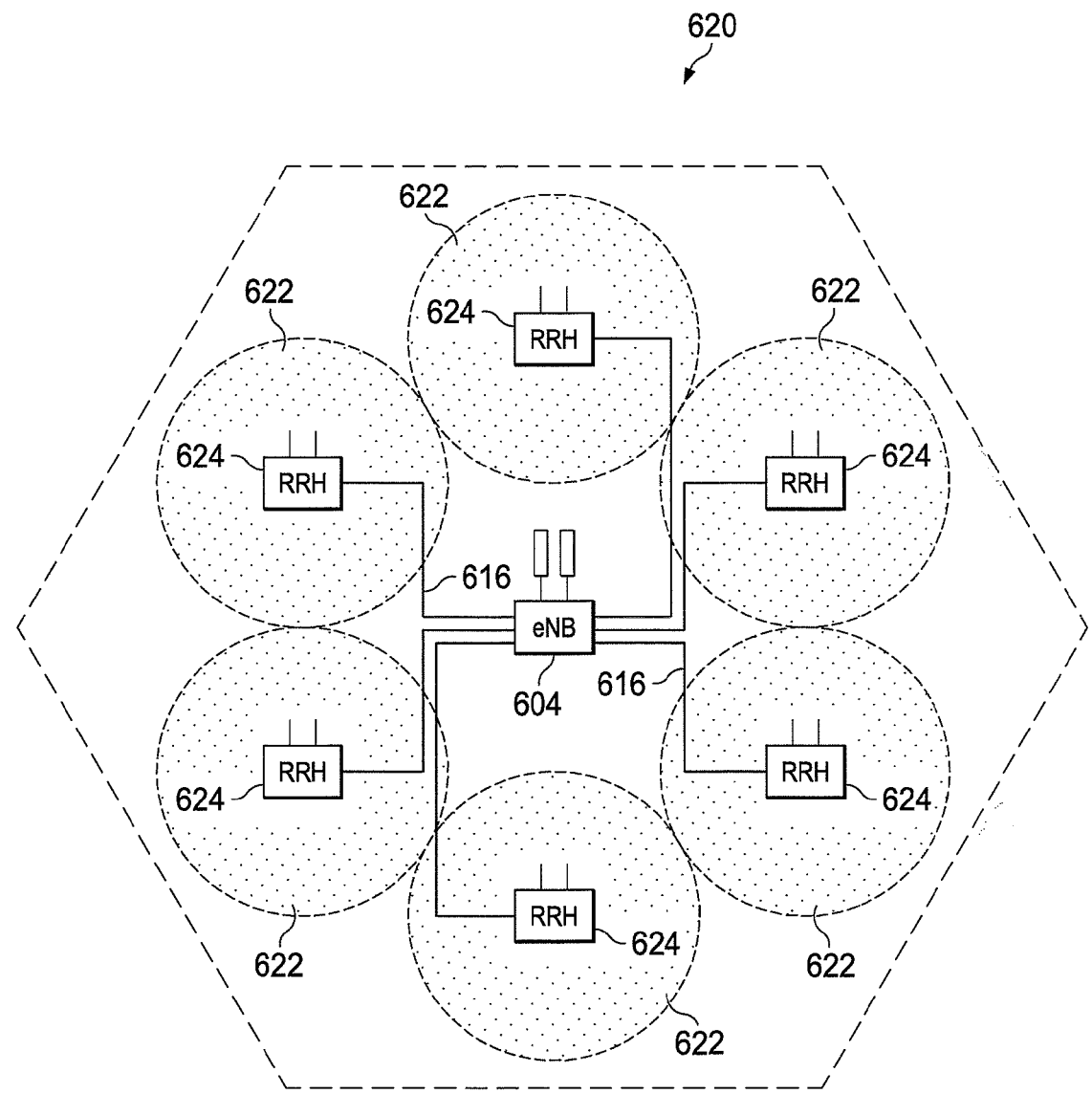

FIGS. 6A, 6B and 6C are high level diagrams illustrating a network within which CSI feedback for coordinated multipoint transmission can be implemented according to embodiments of the present disclosure. The embodiments of the networks shown in FIGS. 6A, 6B and 6C are for illustration only. Other embodiments could be used without departing from the scope of the present disclosure.

FIG. 6A illustrates a homogenous wireless communications network 600 with intra-site CoMP. Each cell or coverage area 602, simplistically depicted in FIG. 6A as a hexagon for convenience of explanation but actually having a variable shape, includes a base station 604, hereinafter also referred to as an evolved Node B (eNB) for purpose of the Long Term Evolution (LTE) family of standards promulgated by the 3rd Generation Partnership Project (3GPP). Each eNB 604 includes a control system, such as a programmable processor, communicably coupled to a memory and via transmitter and receiver chains to a transceiver for transmission and reception of wireless signals using at least one antenna. The control system of each eNB 604 can schedule communications of specific types, such as feedback, from mobile stations within the corresponding coverage area 602. The eNBs 604 are in communication with each other in accordance with the known art to allow for coordinate multi-point transmission of such communications.

A plurality of user equipments (UEs) (or "mobile stations") located in (or moving through) the coverage areas 602 are served by the eNBs 604, receiving wireless signals from an eNB 604 and transmitting data by wireless signals through the eNB 104, and upon occasion can be served by more than one eNB 104 concurrently. Each UE includes a control system, such as a programmable processor, also communicably coupled to a memory and also communicably coupled via transmitter and receiver chains to a transceiver for transmission and reception of wireless signals using at least one antenna. As known in the art, the eNBs 604 and the UEs communicate using Orthogonal Frequency Division Multiplexing (OFDM) symbols transmitted over defined frequencies and time periods comprising a communications channel. The frequencies of the communications channel are divided into bands and subbands, and an individual carrier frequency (or set of carrier frequencies) for one time period is referred to as a "resource element" (RE). The control system of the UE is configured to measure the quality of wireless signals from an eNB 604 on the different bands or subbands, and generate various known channel information for feedback to the eNB 604 based on a "wideband" (a group of subbands) or a subband.

FIG. 6B illustrates a homogenous wireless communications network 610 with one eNB 604 and a plurality of high transmission power remote radio heads (RRHs) 614, each with a coverage area 612. The RRHs 614 each have a structure similar to the eNB 604, including a control system, memory and transmit/receive subsystems. The RRHs 614 are coupled to the eNB 604 by optical fiber 616.

FIG. 6C illustrates a wireless communications network 620 with one eNB 604 having a coverage area 620 and a plurality of low transmission power remote radio heads (RRHs) 624, each with an omni-directional antenna and a coverage area 622. Like the RRHs 614, the RRHs 624 each has a structure similar to the eNB 604, including a control system, memory and transmit/receive subsystems. The RRHs 624 are coupled to the eNB 604 by optical fiber 616.

Using FIG. 6A as representative of all three wireless communication networks depicted in FIGS. 6A through 6C, a UE located in one coverage area 602a can receive wireless signals from an eNB 604a within that coverage area and from another eNB 604b located within an adjacent (or partially overlapping) coverage area 602b. Those wireless signals from the two eNBs 604a, 604b may on occasion interfere with each other, reducing efficiency of wireless communication by requiring that data be resent. Coordinated multi-point transmission by the eNBs 604 improves communication efficiency by, among other things, reducing the incidences of such interference. The coverage area 604a in FIG. 6A is the "coordination area" of interest in the discussion herein.

With the different CoMP transmission schemes described in the background above, the network needs to know the channel quality indicator (CQI), precoding matrix indicator (PMI), and rank indicator (RI) supported by the UE to optimize scheduling. The feedback definitions and measurements are defined for a single-cell transmission for LTE Release 8 to Release 10. The individual CoMP scheme performance may also be characterized by other parameters, such as the TPs used in the CoMP scheme; precoding applied at each of the one or more transmitting TPs; the TPs that are blanked or not transmitting; and the interference measurement resource that may be configured for measurement of individual CQIs.

A CSI reference signal (RS) enables channel measurements by a UE. A UE specific CSI-RS configuration includes: 1) a non-zero power CSI-RS resource; and 2) one or more zero-power CSI-RS resources. Typically, the non-zero power CSI-RS resource corresponds to the antenna elements/ports of the serving cell. Zero-power CSI-RS, also commonly referred to as muted CSI-RS, are used to protect the CSI-RS resources of another cell, and a UE is expected to rate match (skip for decoding/demodulation) around these resources. Additional configuration details of the CSI-RS are specified in 3GPP TS 36.211, particularly in sections 6.10.5 and 7.2.5.

To support CoMP transmission, a network needs feedback corresponding to multiple transmission points or cells. As a result, a network can set up multiple CSI-RS resources, each typically corresponding to a TP or CSI process. Unless otherwise stated, the terms "CSI-RS resource," "TP," and "CSI process" may be used interchangeably. Further details of CSI-RS resource configurations and the configurable parameters for each CSI-RS resource can include that configuration of multiple non-zero-power CSI-RS resources include at least: AntennaPortsCount, ResourceConfig, SubframeConfig, $P_c$, and a Parameter X to derive scrambling initialization:

$$c_{init}=2^{10}\cdot(y\cdot(n_s+1)+l+1)\cdot(2\cdot X+1)+2\cdot X+N_{CP}. \quad (1)$$

X ranges from 0 to 503 and can be interpreted as virtual cell id. In Release 10, X is the PCI of the serving cell. These parameters are configured per CSI-RS resource. Some parameters can be configured per CSI-RS port considering the decision of supporting coherent joint transmission by the aggregate CSI feedback corresponding to multiple TPs in one CSI-RS resource. While the CSI-RS resources capture channels of individual TPs, the interference measurement also depends on the CoMP scheme. In Releases 8-10, a single interference measurement resource is used, which is the cell-specific reference signal (CRS) itself. Interference measurement on CRS captures all the interference outside the cell.

For CoMP, one or more interference measurement resources can be defined to capture the interference for a hypothetical CoMP scheme. At least one Interference Measurement Resource (IMR) (also referred to as a CSI-interference measurement (IM) resource or CSI-IM resource) can be configured for a Release-11 UE. A maximum of only one or multiple IMRs can be configured for a Release-11 UE. Each IMR can consist of only REs, which can be configured as Release 10 CSI-RS resources.

For support of CoMP, new CSI-RS configurations are defined and signaled by higher layers as described herein in accordance with the various embodiments of the present disclosure. In Release-10 and, more specifically, 3GPP TS 36.331, CSI-RS configuration is signaled as follows, where a single non-zero power CSI-RS and its parameters are indicated, while multiple zero-power CSI-RS configurations are indicated using a bitmap.

With one or more interference measurement resources supported for CoMP, CSI measurement is based on both a CSI-RS resource and an IMR or CSI-IM resource. As a result, embodiments of the present disclosure define CSI configurations for feedback.

In various embodiments, if the UE is configured with multiple IMR resources, the CSI configurations can be defined as illustrated in TABLE 1 below, each with an associated (CSI-RS resource index, IMR resource index) pair. Each CSI configuration can be for a particular TP or CSI process.

TABLE 1

| CSI Configuration | CSI-RS Resource Index | IMR Resource Index |
| --- | --- | --- |
| Configuration 1 | X1 | Y1 |
| Configuration 2 | X2 | Y2 |

In certain embodiments, the IMR resource index is based on one of the currently defined 16 CSI-RS resource configurations that are used for zero-power CSI-RS in Release-10 based on a 4Tx CSI-RS pattern (e.g., such as the four CSI reference signal column in Table 6.10.5.2-1. of 36.211): An example instruction (plurality of instructions) can be:

```
-- ASN1START
CSI-Config-r11 ::=    SEQUENCE {
   csi-RS-r11         CHOICE {
      release              NULL,
      setup                SEQUENCE {
         antennaPortsCount-r11    ENUMERATED {an1, an2, an4, an8},
         resourceConfig-r11       INTEGER (0..31),
         subframeConfig-r11       INTEGER (0..154),
         p-C-r11                  INTEGER (-8..15)
         IMR-resourceConfigr-r11     INTEGER (0..15)
         IMRSubframeConfig-r11    INTEGER (0..154)
      }
   }                         OPTIONAL,      -- Need ON
}
-- ASN1STOP
```

In other embodiments, an antenna port count can be additionally indicated to allow configuration of any of the 1 or 2, 4, 8 Tx patterns: An example instruction (plurality of instructions) can be:

```
-- ASN1START
CSI-Config-r11 ::=    SEQUENCE {
   csi-RS-r11         CHOICE {
      release              NULL,
      setup                SEQUENCE {
```

-continued

```
    antennaPortsCount-r11      ENUMERATED {an1, an2, an4, an8},
    resourceConfig-r11         INTEGER (0..31),
    subframeConfig-r11         INTEGER (0..154),
    p-C-r11                    INTEGER(-8..15)
    IMR-antennaPortsCount-r11  ENUMERATED {an1, an2, an4, an8}
    IMR-resourceConfigr-r11              INTEGER (0..15)
    IMRSubframeConfig-r11      INTEGER (0..154)
    }
  }                  OPTIONAL,         -- Need ON
}
-- ASN1STOP
```

In other embodiments, instead of indicating antenna port count, the configuration of any of the 1 or 2, 4, 8 Tx patterns can be allowed by using an aggregate bit field, i.e., a single bit field to indicate a total of 32 (1 or 2 Tx)+16 (4Tx)+8 (8 Tx)=56 patterns: An example instruction (plurality of instructions) can be:

```
-- ASN1START
CSI-Config-r11 ::=  SEQUENCE {
    csi-RS-r11     CHOICE {
      release        NULL,
      setup          SEQUENCE {
        antennaPortsCount-r11      ENUMERATED {an1, an2, an4, an8},
        resourceConfig-r11         INTEGER (0..31),
        subframeConfig-r11         INTEGER (0..154),
        p-C-r10                    INTEGER (-8..15)
        IMR-resourceConfigr-r11              INTEGER (0..56)
        IMRSubframeConfig-r11      INTEGER (0..154)
      }
    }                OPTIONAL,--     Need ON
}
-- ASN1STOP
```

Multiple such CSI configurations can be defined for a UE for CSI feedback purposes.

In certain embodiments, a single IMR resource can be configured, while the multiple CSI-RS resources are configured separately. In this case, each CSI-RS configuration is defined by the associated CSI-RS resource and at least the common IMR resource as illustrated by the pseudo-code segment below:

```
    IMR-CSI-RS-r11   CHOICE {
      release         NULL,
      setup           SEQUENCE {
        IMRResourceConfig-r11      INTEGER (0..15)
        IMRSubframeConfig-r11      INTEGER (0..154)
      }
    }
```

The whole set of configurations (1, 2, 4, 8 Tx) patterns can be using either an antennaportscount parameter or an aggregate IMRresourceconfig parameter as illustrated by the two pseudo-code segments below:

```
IMR-CSI-RS-r11   CHOICE {
  release          NULL,
  setup            SEQUENCE {
    IMR-antennaPortsCount-r11  ENUMERATED {an1, an2, an4, an8},
    IMRResourceConfig-r11      INTEGER (0..15)
    IMRSubframeConfig-r11      INTEGER (0..154)
  }
}
```

```
IMR-CSI-RS-r11   CHOICE {
  release          NULL,
  setup            SEQUENCE {
    IMRResourceConfig-r11      INTEGER (0..56)
    IMRSubframeConfig-r11      INTEGER (0..154)
  }
}
```

In certain embodiments, one or more IMR resources may be configured using the definitions above. In some embodiments, a list of IMR resources can be set up using a single field using by replacing

```
    IMR-resourceConfigr-r11     INTEGER (0..X)
with
    IMR-resourceConfigr-r11     BIT STRING (SIZE(16))
```

In certain embodiments, an interference measurement hypothesis can be based on at least one IMR resource and at least one non-zero power CSI-RS resource. In this case, the UE is expected to measure interference on an IMR resource by just summing or averaging received signal power contribution of corresponding REs. For deriving the interference measurement component from non-zero power CSI-RS resources, the UE performs channel estimation and derives the interference power based on the sum or average power of the CSI-RS ports corresponding to the non-zero-power CSI-RS resource.

TABLE 2 below illustrates an example with an IMR resource Y as configured in the examples above. Such CSI configuration can be set up differently for periodic and aperiodic feedback modes.

TABLE 2

| CSI Configuration | CSI-RS Resource Index | IMR Resource configuration (IMR Resource Index, Non Zero Power CSI-RS Resource Configuration Index) |
|---|---|---|
| Configuration 1 | X1 | (Y, Z1) |
| Configuration 2 | X2 | (Y, Z2) |

The non-zero power CSI-RS (Z1, Z2) resources used can be implicitly known by the UE based on the feedback mode or explicitly configured, as in Table 2 above. In one example for implicit configuration, the non-zero power CSI-RS resources (Z1 for configuration 1) used for interference measurement can include some or all of the non-zero power CSI-RS configured for that UE. In another example, the non-zero power CSI-RS resources used for interference measurement for a CSI configuration is implicitly based on the corresponding CSI-RS resource index (X1 for configuration 1). An example of such a method is that the non-zero power CSI-RS resources (Z1) used for interference measurement are all the configured CSI-RS resources for that UE except X1. In another example, the non-zero power CSI-RS resources (Z1) used for interference measurement are all the CSI-RS resources configured for that UE except those corresponding to the CSI configurations for that UE (i.e., X1, X2). For example, (X1, X2) can be considered a reporting set, while X1 can be considered a transmission set for CSI purposes.

In various embodiments, the PDSCH is not mapped to the REs corresponding to the configured IMR resource(s). The rules for PDSCH mapping to resource elements are outlined in section 6.3.5 of 36.211.

Certain embodiments of the present disclosure include that for each of the antenna ports used for transmission of the physical channel, the block of complex-valued symbols $y^{(p)}(0), \ldots, y^{(p)}(M_{symb}^{ap}-1)$ conform to the downlink power allocation specified in section 5.2 and be mapped in sequence starting with $y^{(p)}(0)$ to resource elements (k, l), which, among other criteria, are not used for transmission of IMR reference signals and the DCI associated with the downlink transmission uses the C-RNTI or semi-persistent C-RNTI, and the index l in the first slot in a subframe fulfills $l \geq l_{DataStart}$ where $l_{DataStart}$ is given by Section 7.1.6.4 of REF.

In addition to the CSI and IMR (or CSI-IM resource) configurations, embodiments of the present disclosure also provide CQI definitions. In one example, the CQI definition is modified as follows. In the CSI reference resource, the UE assumes the following for the purpose of deriving the CQI index, and if also configured, PMI and RI: the first 3 OFDM symbols are occupied by control signaling; no resource elements used by primary or secondary synchronization signals or PBCH; CP length of the non-MBSFN subframes; Redundancy Version 0; if CSI-RS is used for channel measurements, the ratio of PDSCH EPRE to CSI-RS EPRE is as given in Section 7.2.5 of 3GPP TS 36.213. Additionally, for transmission mode x, which is a new transmission mode defined to enable CoMP support for LTE, CSI reporting: CRS REs are as in non-MBSFN subframes; if the UE is configured for PMI/RI reporting, the UE-specific reference signal overhead is consistent with the most recent reported rank; and PDSCH signals on antenna ports (7, . . . , 6+v) for v layers results in signals equivalent to corresponding symbols transmitted on antenna ports $\{a_1 \ldots a_p\}$ of the CSI-RS resource, as given by:

$$\begin{bmatrix} a_1 \\ \vdots \\ a_p \end{bmatrix} = W(i) \begin{bmatrix} x_{(i)}^{(0)} \\ \vdots \\ x_{(i)}^{(v-1)} \end{bmatrix}, \quad (2)$$

where $x(i)=[x_{(i)}^{(0)} \ldots x_{(i)}^{(v-1)}]^T$ is a vector of symbols from the layer mapping in section 6.3.3.2 of 3GPP TS 36.211, $P \in \{1,2,4,8\}$ is the number of CSI-RS ports configured for the CSI-RS resource, and if only one CSI-RS port is configured, W(i) is 1, otherwise W(i) is the precoding matrix corresponding to the reported PMI applicable to x(i). The corresponding PDSCH signals transmitted on antenna ports $\{a_1 \ldots a_p\}$ has a ratio of EPRE to CSI-RS EPRE equal to the ratio given in section 7.2.5 of 3GPP TS 36.213. If IMR based interference measurement is configured for the UE, assume the interference is the sum of interference observed on the IMR resource and one or more non-zero power CSI-RS resources configured for the CQI measurement (i.e., associated with the CSI request or higher layer configuration), where the individual contributions are obtained as: for interference measurement based on a non-zero power CSI-RS resource, the interference is based on the [average] received power on the reference signals corresponding to the CSI-RS antenna ports of the CSI-RS resource; and for interference measurement based on an IMR resource, the interference measurement is the total power (or average power) observed on the REs corresponding to the IMR resource. Further, in the CSI reference resource, the UE assumes the following for the purpose of deriving the CQI index, and if also configured, PMI and RI: no REs allocated for CSI-RS and zero-power CSI-RS and IMR resources; no REs allocated for PRS; and the PDSCH transmission scheme given by Table 7.2.3-0 of 3GPP TS 36.213, depending upon the transmission mode currently configured for the UE (which may be the default mode).

In certain embodiments, the interference measurement can only be performed if an IMR resource is configured by higher layers. In this case, the condition for interference measurement in the CQI definition can be modified as if at least one IMR resource is configured by higher layers for the UE.

In certain embodiments, if the CSI configuration corresponding to the CQI requested as part of a periodic feedback mode or an aperiodic CSI request has a configured IMR resource, then interference measurement can be defined with the condition if at least one IMR resource is configured as part of the periodic CSI configuration or aperiodic CSI request.

If interference measurement based on a non-zero power CSI-RS resource is not supported, then the text in the CQI definition can be modified as if IMR based interference measurement is configured for the UE, assume the interference is based on an IMR resource, where the interference is the total power (or average power) observed on the REs corresponding to the IMR resource. The same or similar modifications outlined above can be applied to this case as well for the condition to trigger IMR based interference assumption.

In accordance with the above definitions for multiple CSI and/or IMR configurations, embodiments of the present disclosure provide for periodic feedback modes based on the PUCCH. Periodic feedback modes are based on semi-persistent configuration of uplink control information on the PUCCH channel. These feedback modes are configured with a certain periodicity and offset. The supported feedback modes, individual report types, and timing configuration (periodicity, offset) are summarized in 3GPP TS 36.213 Table 7.2.2-1. Additionally, various CQI/PMI and RI reporting types with distinct periods and offsets are supported for the PUCCH CSI reporting modes as given in 3GPP TS 36.213 Table 7.2.2-3.

For each serving cell, the periodicity $N_{pd}$ (in subframes) and offset $N_{OFFSET,CQI}$ (in subframes) for CQI/PMI reporting are determined based on the parameter cqi-pmi-ConfigIndex ($I_{CQI/PMI}$) given in 3GPP TS 36.213 Table 7.2.2-1A for frequency division duplex (FDD) and 3GPP TS 36.213 Table 7.2.2-1C for time division duplex (TDD). The periodicity $M_{RI}$ and relative offset $N_{OFFSET,RI}$ for RI reporting are determined based on the parameter ri-ConfigIndex ($I_{RI}$) given in 3GPP TS 36.213 Table 7.2.2-1B. Both cqi-pmi-ConfigIndex and ri-ConfigIndex are configured by higher layer signaling. The relative reporting offset for RI $N_{OFFSET,RI}$ takes values from the set $\{0, -1, \ldots, -(N_{pd}-1)\}$. If a UE is configured to report for more than one CSI subframe set, then parameter cqi-pmi-ConfigIndex and ri-ConfigIndex respectively correspond to the CQI/PMI and RI periodicity and relative reporting offset for subframe set 1 and cqi-pmi-ConfigIndex2 and ri-ConfigIndex2 respectively correspond to the CQI/PMI and RI periodicity and relative reporting offset for subframe set 2.

As an example, the wideband CQI/PMI reporting timing is defined as follows based on configured timing parameters. Similar definitions are defined in 36.213 for other report types. In the case where wideband CQI/PMI reporting is configured: the reporting instances for wideband CQI/PMI are subframes satisfying:

$$(10 \times n_f + \lfloor n_s/2 \rfloor - N_{OFFSET,CQI}) \mod (N_{pd}) = 0. \quad (3)$$

In case RI reporting is configured, the reporting interval of the RI reporting is an integer multiple $M_{RI}$ of period $N_{pd}$ (in subframes). The reporting instances for RI are subframes satisfying $$(10 \times n_f + \lfloor n_s/2 \rfloor - N_{OFFSET,CQI} - N_{OFFSET,RI}) \mod(N_{pd}) = 0.$$

To support CoMP transmissions, embodiments of the present disclosure set up feedback corresponding to more than one CSI-RS configurations (resources, CSI processes, or TPs) and define new feedback modes for this purpose. As used herein, a CSI configuration means a (CSI-RS resource, IMR resource) pair. However, with a single IMR resource, a CSI configuration may be simply replaced by the CSI-RS resource.

In one embodiment, independent periodic PUCCH for multiple CSI configurations is provided. In this embodiment, the periodic feedback mode parameters are set up independently for two or more CSI configurations. This embodiment is suitable, for example, when no inter-CSI-RS feedback is needed. Inter-CSI-RS resource feedback refers to feedback that relies on measurement of more than one CSI-RS resource. Additional examples of inter-CSI-RS resource feedback are described below.

When two or more periodic reports are configured, the timing parameters chosen may result in a collision of certain reports. Such a collision may be avoidable sometimes by the appropriate choice of parameters by the scheduler, but may not always be avoidable due to scheduling flexibility issues. Embodiments of the present disclosure provide different ways to handle such a collision. The methods and embodiments described below can also apply to UEs configured with multiple component carriers when two or more periodic CSIs reporting for the multiple component carriers are scheduled in a same subframe.

In certain embodiments, only one of the reports may be sent and remaining reports may be dropped (i.e., not transmitted). In this situation, dropping rules are defined, which are clear to both the UE and the eNB. In certain embodiments, in case of collision between two PUCCH reports for different CSI-RS resources, the UE may drop the feedback based on report type. In certain embodiments, the report to be transmitted is selected based on the report type. For example, an RI report can be considered more useful than other CQI/PMI reports, and a wideband CQI/PMI report can be prioritized over a subband CQI/PMI report. In such a case, a priority order is defined for each report. As an example, reporting types 3, 5, or 6 can have higher priority over reporting types 1, 1a, 2, 2a, 2b, 2c, or 4. So, if a report type for a first CSI-RS resource is type 3 and report type for a second CSI-RS resource is type 1, then the report corresponding to the first CSI-RS resource is prioritized to be sent.

In certain embodiments, in case of collision between two PUCCH reports for different CSI-RS resources, the UE can drop the feedback based on CSI-RS transmission. As discussed above, each CSI-RS resource has a unique subframe configuration parameterized by a periodicity and timing offset when the corresponding CSI-RS are sent. In one method, the reports corresponding to different CSI-RS resources are prioritized based on the timing relationship with past CSI-RS transmissions of the corresponding resources. In another method, the report corresponding to the CSI-RS resource with the most recent CSI-RS transmission is prioritized, since the corresponding CSI is more useful (considering time variation of CSI).

In certain embodiments, in case of collision between two PUCCH reports for different CSI-RS resources, the UE can drop the feedback based on the CSI-RS resource with best performance. In one method, the report corresponding to the CSI-RS resource is prioritized based on the performance attributed to the CSI-RS resource. In one method, the prioritization can be based on CQI (wideband or subband). Since the network may not be aware of the current CQI, in one method, an index of the chosen CSI-RS resource is reported. In another method, to avoid additional reporting, the prioritization can be based on the most recently reported wideband CQI of each report. In another method, other feedback parameter also can be used like RI as a performance metric. In another method, the choice of the CSI-RS for reporting can be based on the corresponding RSRP or RSRQ if an RSRP type metric can be associated with a CSI-RS configuration. Such RSRP may be separately reported by the UE and known to eNB.

In certain embodiment, in case of collision between two PUCCH reports for different CSI-RS resources, the UE drops the feedback based on the CSI-RS resource index. In one method, the prioritization of a report corresponding to a CSI-RS resource can be simply based on the CSI-RS resource index. Multiple CSI-RS resources are configured by RRC (higher layer) signaling, thereby implicitly associating an index (from the signaled order) to each of the CSI-RS resources. This allows the network to prioritize a CSI-RS resource by network configuration. Such prioritization/indexing can be affected by the scheduling aspects and/or signal strength measured by the network for the corresponding CSI-RS resource.

In certain embodiments, in case of collision between two PUCCH reports for different CSI-RS resources, the UE drops the feedback based on reporting mode parameters. In one method, the prioritization of the reports is based on the feedback mode setup parameters like periodicity and offset ($N_{pd}$, $N_{offset}$).

In certain embodiments, when the multiple CSI reports corresponding to two or more CSI-RSs collide, all the CSI reports are multiplexed and sent together. Different approaches can be used for multiplexing. For example, the reports can be multiplexed based on PUCCH Format 3. Though the individual reports are transmitted based on different PUCCH formats, in the event of collision, multiple reports are multiplexed into a single report using the higher capacity PUCCH channel format 3, which can support less than or equal to 22 bits. In one method, when more than three reports collide, two of the reports are multiplexed and the rest of the reports are dropped. The prioritization for selecting the multiplexed reports and the dropped reports can follow one or more dropping rules discussed previously. In another method, the number of reports multiplexed is such that they can be supported by the format size of the PUCCH format 3. For example, three RI reports (≤3 bits each) can be accommodated in a single PUCCH Format 3 report. In one method, whether to multiplex using PUCCH Format 3 or drop the reports (except one) is based on the link quality of the UE. In one method, whether to multiplex using PUCCH Format 3 or drop the reports (except one) can be configured by higher layers.

In other examples, whether the reports are to be multiplexed can be conditioned on the physical uplink shared channel (PUSCH). The network can control the behavior in the event of collision. In one method, a PUSCH resource can be scheduled for the UE for transmission on uplink control information (UCI) (or CSI) in that sub-frame. If a UL grant for such a PUSCH resource is detected, the UE transmits the multiplexed report on the PUSCH (which has a larger capacity than PUCCH). If no grant for PUSCH resource is detected, the UE simply drops one or more reports, for example, according to the dropping rules described above. More generally, the multiplexing/dropping behavior can be based on the configuration and the size of the PUSCH resource (e.g., two or three reports may be multiplexed based on the PUSCH resource size and/or configuration).

The network also can semi-statically configure PUSCH resources, since the network is aware of the collision instances. In such examples, if a PUSCH resource is configured in a sub-frame with collision event, multiplexing of reports may be used. Otherwise, CSI dropping can be used, for example, according to the dropping rules described above. If the UL grant for such a configured PUSCH resource has non-zero value for a CSI request field, then a periodic CSI report as configured by CSI request is transmitted and periodic CSI is dropped. If the UL grant for such a configured PUSCH resource has zero value for CSI request field, and in the event of collision of two or more CSI reports, then the periodic CSI report is sent by multiplexing the CSI reports as described above. In one method, even if simultaneous transmission of PUCCH and PUSCH is configured, in case of collision of periodic CSI reports, both the CSI and data are multiplexed on PUSCH.

In some cases, other control information on the uplink, such as ACK/NACK feedback, can collide with CSI. In this case, the dropping and multiplexing rules can be further modified by such an event. In one method, if the UE is configured with simultaneous PUCCH/PUSCH transmission, in the event of collision of periodic PUCCH CSI reports, the CSI is transmitted on a scheduled PUSCH resource and ACK/NACK is transmitted on the PUCCH resource configured for ACK/NACK (e.g., PUCCH format 1a/1b/3). If the UE is not configured for simultaneous PUCCH/PUSCH transmission and in the event of collision of periodic PUCCH CSI reports, the CSI and ACK/NACK are transmitted on a scheduled PUSCH.

In other examples, whether the reports are to be multiplexed is based on semi-statically configured PUCCH Format 3. In one method, a network semi-statically configures a PUCCH Format 3 resource, since the network is aware of the collision instances. If such a configured PUCCH Format 3 resource is available, a UE multiplexes the CSI in the configured PUCCH Format 3 or drops CSIs according to the dropping rules described above.

In some cases, other control information on the uplink like ACK/NACK feedback may collide with CSI. In this case, the dropping and multiplexing rules can be further modified by such an event. In one method, if an ACK/NACK (or SR) collides with CSI, one or more of the CSI can be multiplexed with the ACK/NACK using PUCCH Format 3 configured for ACK/NACK. In another method, if an ACK/NACK (or SR) collides with CSI, one or more of the CSI can be multiplexed with the ACK/NACK using PUCCH Format 3 configured for CSI. This behavior can be dependent upon the higher-layer configured value of simultaneousAckNack-AndCQI. For example, ACK/NACK and CSI can be multiplexed if simultaneousAckNackAndCQI==TRUE, while only ACK/NACK is transmitted on the PUCCH Format 3 configured for ACK/NACK with dropping CQI if simultaneousAckNackAndCQI=FALSE. In another method, if the UE is configured with simultaneous PUCCH/PUSCH transmission, in the event of collision of periodic PUCCH CSI reports in a subframe in which a PUSCH is scheduled, the CSI is transmitted on a scheduled PUSCH resource and ACK/NACK is transmitted on the PUCCH resource configured for ACK/NACK. If the UE is not configured with simultaneous PUCCH/PUSCH transmission, in the event of collision of periodic PUCCH CSI reports in a subframe in which a PUSCH is scheduled, the CSI and ACK/NACK are transmitted on a scheduled PUSCH resource.

The term "CSI configuration" is used to refer to at least the corresponding CSI-RS resource and the IMR resource. It may also include other parameters like the non-zero power CSI-RS resources that can be used for interference part. A CSI report on the other hand is a feedback report that is sent in an uplink subframe with an associated CSI configuration and a serving cell and belongs to one of the report types and includes feedback elements like PMI/CQI/RI. In this context, it also corresponds to the report that is colliding at a given subframe.

If two CSI reports corresponding to the same serving cell and the same CSI configuration collide, a single CSI report is selected based on the type, using the following method that is defined in 36.213 for collisions for the same serving cell. That is, in case of collision of a CSI report with PUCCH reporting type 3, 5, or 6 of one serving cell with a CSI report with PUCCH reporting type 1, 1a, 2, 2a, 2b, 2c, or 4 of the same serving cell the latter CSI report with PUCCH reporting type (1, 1a, 2, 2a, 2b, 2c, or 4) has lower priority and is dropped. An assumption is made that such a first step is applied and the collision rules described in this disclosure apply to resolving collision of the CSI reports, each of which has a unique (serving cell, CSI configuration pair). In the embodiments below, "CSI configuration" and "CSI report" can be used interchangeably when convenient, since at a given collision instance, there is a one to one mapping between the two with the above understanding of a first step resolution.

Embodiments of the present disclosure include that the CSI parameters (e.g., PMI/RI/CQI) corresponding to colliding CSI reports of multiple CSI configurations can be compressed, for example, to reduce the overhead. In one embodiment, such compression as further described below can only be applied if the report types of the colliding CSI reports are the same. In certain embodiments, two colliding CSI reports are compressed to less than 11 bits. Compression can be done by different approaches as follow: in one approach, the corresponding parameters are jointly or differentially encoded with each other; in another approach, the one or more parameters are aligned between CSI reports; or in another approach, the rank and/or PMI may be required to be the same between CSI reports.

In one case where rank is required to be the same, it can be determined by the UE based on: the rank corresponding to the CSI-RS report with highest measured CQI, the rank corresponding to the CSI-RS report with lowest (or highest) measured rank, or the restricted rank that can be explicitly configured by the network for CSI reporting to be applied in case of collisions of two periodic reports.

In certain embodiments, a PMI is required to be the same if the two CSI configurations of the colliding CSI reports have the same associated CSI-RS resources (with different IMR resource configuration). The PMI can be required to be reported based on: the PMI of the CSI-RS report with highest (or lowest) measured CQI, the PMI of the CSI-RS report with highest (or lowest) measured rank, the CSI-RS configuration index or prioritization that is explicitly configured by the network for CSI reporting to be applied in case of collisions of two periodic reports, and the associated IMR resource index or prioritization that is explicitly configured by the network for CSI reporting to be applied in case of collisions of two periodic reports.

In certain embodiments, in case of collision of multiple periodic CSI reports, if the feedback mode corresponding to the different CSI reports is the same, compression is applied. Otherwise, if the feedback mode is different dropping or multiplexing, with no compression, is applied.

In certain embodiments, a different handling rule is applied based on the CSI configuration corresponding to the CSI reports. In certain embodiments, the following rule is employed: if the CSI configurations have the same CSI-RS resource, but different IMR resources, then the PMI is aligned and rank is reported individually; if the CSI configurations have the same IMR resource, but different CSI-RS resources, then the rank is aligned, but PMI is reported individually; and if the CSI configurations has neither the same IMR resource nor the same CSI-RS resource, then both the rank and PMI are individually reported (i.e., no compression).

In certain embodiments, interference measurement for a CSI configuration is based on both an IMR resource and one or more non-zero power CSI-RS resources. In such case, the above rule is rewritten as follows: if the CSI configurations have the same CSI-RS resource, but different interference measurement configurations, then the PMI is aligned and rank is reported individually; if the CSI configurations have the same interference measurement configuration, but different CSI-RS resources, then the rank is aligned, but PMI is not aligned; and if the CSI configurations have neither the same interference measurement configuration nor the same CSI-RS resource, then both the rank and PMI are individually reported—i.e., no compression where an interference measurement configuration is used to refer to at least an IMR resource (and optional non-zero power resource configured for interference measurement).

In certain embodiments, in each of the above rules, the third condition is modified to: if the CSI configurations have neither the same interference measurement configuration nor the same CSI-RS resource, then only one (or a subset if there are more than two colliding reports) of the CSI reports is fed back and others are dropped.

Embodiments of the present disclosure consider the cases where colliding CSI reports correspond to more than one cell (carrier) and at least one cell has multiple CSI reports, each corresponding to a CSI configuration, which could happen if a UE can be configured with multiple periodic feedbacks corresponding to different carriers as well as different CSI-RS configurations. The collision of reports in carrier aggregation (CA) and CoMP could be such a case.

TABLE 3 below illustrates an example with collision of three CSI reports.

TABLE 3

| Periodic CSI Configuration | Cell Type/Index (Carrier Type/Index) | CSI configuration (CSI-RS resource and an IMR resource) |
| --- | --- | --- |
| 1 | Primary cell | CSI configuration 1 |
| 2 | Primary cell | CSI configuration 2 |
| 3 | Secondary cell 1 | CSI configuration 1 |

It is noted that in the embodiments below, "CSI configuration" and "CSI report" are used interchangeably, since at a given collision instance, there is a one to one mapping between the two.

The collision resolution rules for the types of carrier aggregation without CoMP, and CoMP without carrier aggregation are defined as subrules that can be reused for the collision of CSI reports in CA and CoMP.

Firstly, the rules for CA without CoMP type have been defined to resolve collision when there are multiple reports each corresponding to different cell. Only a single CSI configuration is configured per cell. Considering CoMP was not introduced, the section 7.2.2 of Release-10 LTE describes the rules for the CA without CoMP type as follows. If the UE is configured with more than one serving cell, the UE transmits a CSI report of only one serving cell in any given subframe. For a given subframe, in case of collision of a CSI report with PUCCH reporting type 3, 5, 6, or 2a of one serving cell with a CSI report with PUCCH reporting type 1, 1a, 2, 2b, 2c, or 4 of another serving cell, the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell with CSI report with PUCCH reporting type 1 or 1a of another serving cell, the latter CSI report with PUCCH reporting type 1, or 1a has lower priority and is dropped.

Secondly, the rules for this CoMP without CA are defined to resolve collision when there are multiple reports each corresponding to a different CSI configuration, all on single serving cell. Similarly, when we refer to rules for resolving CoMP without CA, we refer to new rules that are defined in a future release that apply in such a case; some example extensions are considered in the above embodiments.

In one approach, various embodiments prioritize CA to resolve collision of CSI reports. In certain embodiments, the CSI report of a single CSI configuration is selected from each cell. The selection of such single configuration is by using one of the dropping rules for multiple CSI configurations on a single cell described above for the type of CoMP without CA. In the next step, the selected CSI reports from each of the cells are dropped or multiplexed following the rules as used for CA without CoMP.

In certain embodiments, the CSI reports of the CSI configurations from each cell are compressed to fit in a PUCCH Format 2a or 2b. In the next step, the selected CSI reports from each of the cells are dropped or multiplexed following the rules as used for CA without CoMP.

In certain embodiments, the CSI reports of the CSI configurations from each cell are compressed to fit in a PUCCH Format 2a or 2b (i.e., the number of CSI bits in the CSI reports from each cell is less than or equal to 11). In the next step, the selected CSI reports from each of the cells are dropped or multiplexed so that the final resulting CSI for the CA+CoMP has less than or equal to 22 bits to fit in a PUCCH format 3.

In certain embodiments, the CSI reports of the CSI configurations from each cell are multiplexed to fit in a PUCCH format 3. In the next step, the selected CSI reports from each of the cells dropped or multiplexed following the rules as used for CA without CoMP.

In certain embodiments, the CSI reports of the CSI configurations from each cell are multiplexed to fit in a PUSCH configuration. In the next step, the selected CSI reports from each of the cells dropped or multiplexed following similar rule as used for carrier aggregation without CoMP.

In another approach, various embodiments prioritize CoMP to resolve collision of CSI reports. In certain embodiments, a single cell is selected by prioritizing based on the cell index in a first step. In a second step, the collision handling of the multiple CSI reports of a single cell is done by applying similar rules to that of carrier aggregation without CoMP.

In another approach, the UE behavior is unspecified if such a collision happens—that is, it is left to UE implementation. In certain embodiments, in case of such collision a default UE behavior is specified. Examples of such default behavior include feeding back the CSI report corresponding to the lowest cell index and the lowest CSI configuration index (or lowest CSI-RS or IMR index). Another default behavior is to not report anything.

In another approach, in case of such collision, a PUSCH report is sent by the UE including all the reports. This behavior could be configurable by the network.

In another approach, various embodiments use different PUCCH formats to resolve collision of CSI reports. Let us consider that a UE is configured with carrier aggregation (i.e., multiple cells/carriers).

In case of collision of multiple CSI reports that are all from a single cell, PUCCH format 3 is used to multiplex multiple CSI reports of the single cells. If the payload is beyond the capacity of Format 3 or if the number of reports is greater than certain number (e.g., 2), some reports can be dropped following the previously described dropping rules.

In case of collision of multiple CSI reports corresponding to multiple cells, with more than two CSI-RS reports corresponding to multiple CSI configurations for at least one cell (CA+CoMP case), then in a first step the one or more reports corresponding to each cell are either compressed or multiplexed or down-selected to a PUCCH format 2a/2b report size. In the next step, the dropping/multiplexing rules corresponding to carrier aggregation without CoMP are then used.

In the event that a UE is configured with carrier aggregation (i.e., multiple cells/carriers), the rule is defined for collision handling as follows: In case of collision of multiple CSI reports that are all from a single cell, then PUSCH is used to multiplex multiple CSI reports of the primary cell; the other reports could be completely dropped or down-selected/multiplexed to be sent on PUCCH 2a/2b or 3.

In another approach, the collision handling could be different depending on the primary cell CSI reports in the collision.

In certain embodiments, if the primary cell has a single CSI report, then carrier aggregation is prioritized over CoMP and one of the corresponding embodiments for prioritizing CA over CoMP described earlier are used. If primary cell has more than one CSI report, then the CoMP is prioritized over carrier aggregation and one of the corresponding embodiments for prioritizing CoMP over CA described earlier is used. If there is no primary cell report, then a default rule may be used, e.g., only a single CSI report is selected by dropping all the other reports or not to report anything.

In another approach, the three or more CSI reports are first down selected to one or more CSI reports based on the type of the report. In the next step, if only a single report remains, then that report is sent; if two reports remain, then either the CoMP without CA or the CA without CoMP collision handling rules are applied; and if more than two reports remain, then either the behavior is left unspecified or a default behavior is specified or one or more of the collision handling rules described above can be used or a type (of the remaining CSI reports) dependent behavior is specified. Default behaviors could be to feedback nothing or feedback a single report dropping others or feedback the CSI report of the lowest cell index and the lowest CSI configuration index dropping others.

In certain embodiments, a first RRC configuration is used to define the collision resolution behavior that applies in the case of CA without CoMP, i.e., when CSI reports corresponding to multiple cells collide, but with only a single CSI report per cell. A second RRC configuration is used to define the collision resolution behavior in case of CoMP without CA collision, i.e., when CSI reports corresponding to multiple CSI configurations of a single cell. A third RRC configuration is used for the collision resolution behavior of CoMP and CA collision. An RRC configuration is one or more configurable parameters that could represent, for example, whether dropping or multiplexing or compression schemes are used. As another example, the configurable parameters could include thresholds that are used for switching between different behaviors. Such thresholds could be, for example, i) the number of colliding reports, ii) the number of bits in each of the colliding reports, iii) the total number of bits in the colliding reports. As another example, the configurable parameters could refer to the whether certain uplink formats are used, which could include: i) PUCCH Format 2/2a/2b, ii) PUCCH Format 3, and/or iii) PUSCH.

In certain embodiments, a UE derives the collision rules for the case of CoMP and CA collision, i.e., collision of multiple CSI reports corresponding to multiple cells, with more than two CSI reports corresponding to multiple CSI configurations for at least one cell, based on the first and the second RRC configurations.

In certain embodiments, a UE derives the collision rules for the case of CoMP and CA collision based on the first RRC configuration only. In one example, the first RRC configuration parameters regarding the case of CA without CoMP indicates either the dropping scheme as in Rel-10 specification or a multiplexing/compression scheme (some examples can be found in embodiments of dropping some reports, multiplexing the reports, and compressing the reports as described above) should apply.

For resolving the collision of CoMP and CA, the UE behavior changes depending upon whether the first RRC configuration parameters indicate the dropping or the multiplexing/compression scheme: When dropping is configured, the UE would transmit only one cell's CSI report after compressing/multiplexing/dropping the CoMP CSI reports in each of the configured cells according to the pre-defined embodiment (some examples can be found in embodiments of dropping some reports, multiplexing the reports, and compressing the reports as described above), where the only one cell's CSI report is conveyed in PUCCH format 2/2a/2b, for example. Here, the UE behavior of transmitting only one cell's CSI report out of the multiple cells' CSI reports can be defined according to an embodiment in embodiment 1 or the Rel-10 UE behavior when multiple CSI reports for multiple cells collide in a subframe, for example; When the multiplexing/compression is configured, the UE would compress/multiplex multiple cells' CSI reports to carry in either PUCCH format 3 or PUSCH according to a pre-defined embodiment (some examples can be found in embodiments of multiplexing the reports and compressing the reports as described above) after compressing/multiplexing/dropping the CoMP CSI reports in each of the configured cells according to a pre-defined embodiment (some examples can be found in embodiments of dropping some reports, multiplexing the reports, and compressing the reports as described above).

In certain embodiments, a UE derives the collision rules for the case of CoMP and CA collision based on the third RRC configuration only.

In certain embodiments, a UE uses one or more of the first, the second and the third RRC configurations in deriving collision rules for CoMP and CA collision.

Embodiments of the present disclosure include joint configuration of multiple periodic reports. In various embodiments, in the presence of some reports that carry inter-CSI-RS resource feedback, setup of a single PUCCH feedback mode is preferred. Some examples of such inter-CSI-RS resource feedback may include a single RI feedback. For example, the network can require a single RI report for two or more CSI-RS resources that feedback is requested for. Such alignment of rank enables a network to perform joint transmission based on per-CSI-RS resource feedback.

Another example of such inter-CSI-RS resource feedback may include aggregate CQI feedback. Aggregate CQI is the CQI assuming joint transmission from one or more transmission points. Another example of such inter-CSI-RS resource feedback includes aggregate PMI. Aggregate PMI is the PMI assuming joint transmission from one or more transmission points. Another example of such inter-CSI-RS resource feedback includes inter-TP phase feedback. The phase feedback corresponding to phase alignment between two CSI-RS resources for joint transmission.

In certain embodiments, feedback modes are defined for two or more CSI-RS resource joint feedback configuration according to TABLE 4 below.

TABLE 4

| | | (PMI Feedback Type, CoMP Feedback Type) | | | |
|---|---|---|---|---|---|
| | | No PMI, One CSI-RS Resource | Single PMI, One CSI-RS Resource | No PMI, Two CSI-RS Resource | Single PMI, Two CSI-RS resource |
| PUCCH CQI Feedback Type | Wideband (wideband CQI) | Mode 1-0 | Mode 1-1 | Mode 1-4 | Mode 1-5 |
| | UE Selected (subband CQI) | Mode 2-0 | Mode 2-1 | Mode 2-4 | Mode 2-5 |

Figure 7:
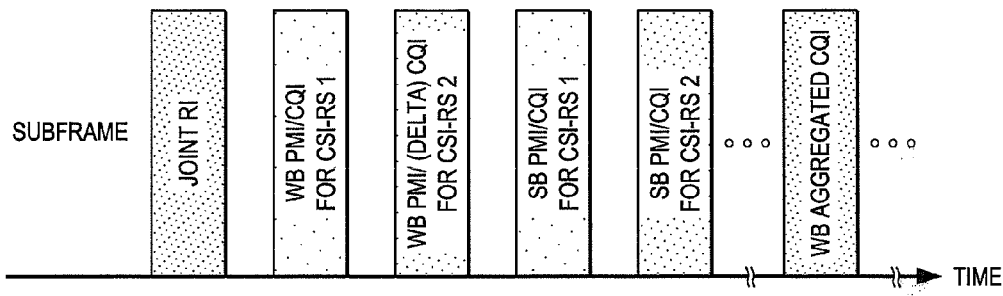
FIG. 7 illustrates feedback reporting corresponding to multiple CSI-RS resources which may be multiplexed in time in accordance with embodiments of the present disclosure.

FIG. 7 illustrates feedback reporting corresponding to multiple CSI-RS resources, which may be multiplexed in time in accordance with an exemplary embodiment. In this illustrative embodiment, independent reports are multiplexed (i.e., an independent report type (e.g., wideband CQI associated with each CSI-RS resource) is configured with a single set of periodicity/offset parameters across all CSI-RS resources). New report types, like aggregate CQI, are transmitted with the correspondingly-defined timing parameters (e.g., $Nd_{aggregateCQI}$, $Noffset_{aggregateCQI}$).

Figure 8:
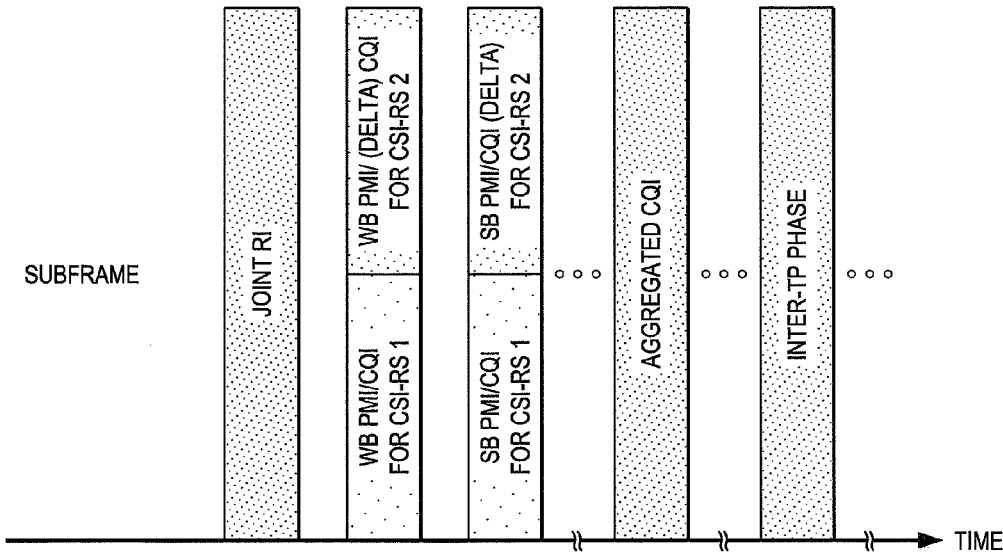
FIG. 8 illustrates feedback reporting for multiple CSI-RS resources which may be configured together for certain report types in accordance with embodiments of the present disclosure.

FIG. 8 illustrates feedback reporting for multiple CSI-RS resources, which can be configured together for certain report types in accordance with an exemplary embodiment. In certain embodiments, reports for multiple CSI-RS resources are configured together for certain report types, such as wideband/subband CQI or wideband/subband PMI. Further, the CQIs can be jointly encoded with differential encoding. In such a case, PUCCH Format 3 can be used for transmission of such new report type. The inter-CSI-RS resources CQIs, such as an aggregate CQI, are configured separately with their timing parameters (e.g., $Nd_{aggregateCQI}$, $Noffset_{aggregateCQI}$). In certain embodiments, one or more of the report types (e.g., aggregate CQI, inter-TP phase) are made configurable within a single mode. Such configuration can be indicated by RRC configuration as a submode parameter for that mode.

Figure 9A:
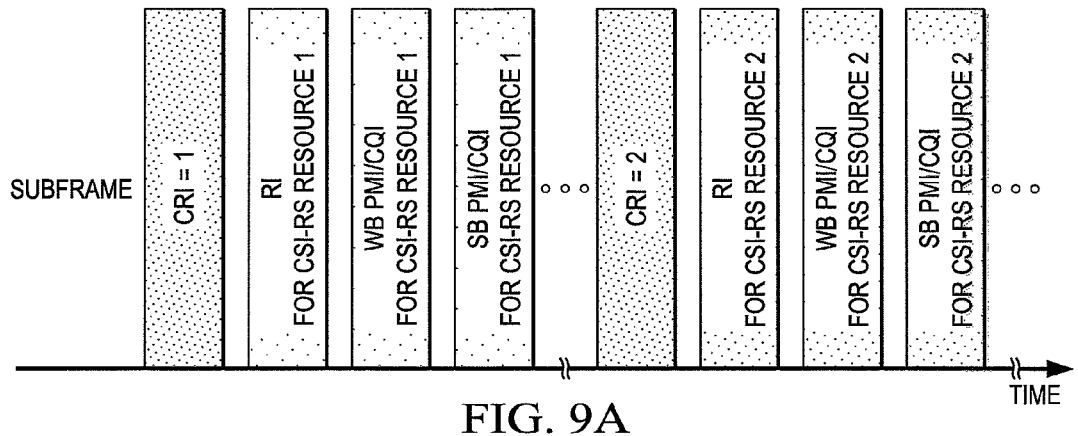
FIGS. 9A and 9B illustrate examples of a single periodic PUCCH configured with UE autonomous TP switching in accordance with embodiments of the present disclosure.
Figure 9B:
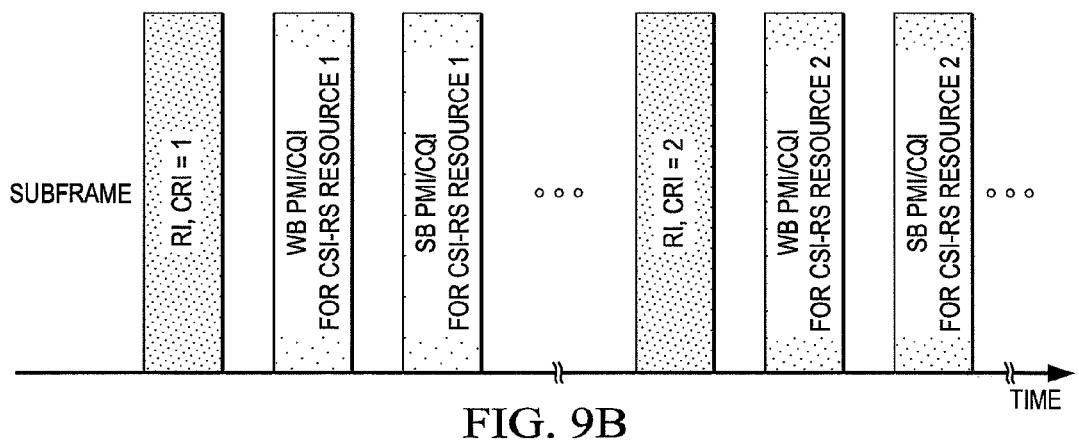

FIGS. 9A and 9B illustrate examples of a single periodic PUCCH configured with UE autonomous TP switching in accordance with illustrative embodiments of the present disclosure. The embodiments shown in FIGS. 9A and 9B are for illustration only. Other embodiments could be used without departing from the scope of the present disclosure.

In certain of these embodiments, the UE transmits the CSI corresponding to a single CSI-RS resource only. The UE can choose a respective CSI to transmit based on performance (e.g., CQI or RSRP). The UE measures the CSI of individual CSI-RS resources and switches between the reporting types based on the best CQI or RSRP. A CSI-RS Resource indicator (CRI) can be sent separately to indicate switching. FIG. 9A illustrates an example embodiment where the RI and CRI are separately signaled. FIG. 9B illustrates another example embodiment where the RI and CRI are jointly encoded.

Various embodiments of the present disclosure provide indications of CQI reference resource and interference measurement resource. A CSI reference resource is the resource that UE's feedback should correspond to. The UE implementation is not precluded from averaging over "similar" subframes. Interference measurement in Release-10 relies on CRS that are available in every subframe. Hence, no reference to interference measurement is made in previous CSI reference resource definitions. 3GPP 36.213 section 7.2.3 provides a definition of the CSI reference resource.

In certain embodiments, the network explicitly indicates the IM resource for periodic CSI configuration. The IM resource (CSI-IM resource) index(es) and CSI-RS resource index(es) are associated with each PUCCH feedback mode configuration and may be explicitly indicated with RRC configuration for one or more periodic CSI configuration (or CSI processes) as illustrated in TABLE 5 below. As a result, the CSI reference resource definition can be modified to incorporate IM resource for periodic CSI reporting.

TABLE 5

| Periodic CSI Configuration | CSI-RS Resource Index | IMR Index |
|---|---|---|
| Configuration | X | Y |

In certain embodiments, the reference subframe is defined without reference to the interference measurement. Interference is based on measurements on the subframes with configured IMR resource(s). It is assumed that UE performs interpolation/extrapolation of interference if the reference subframe does not include corresponding IMR resource(s).

Figure 10A:
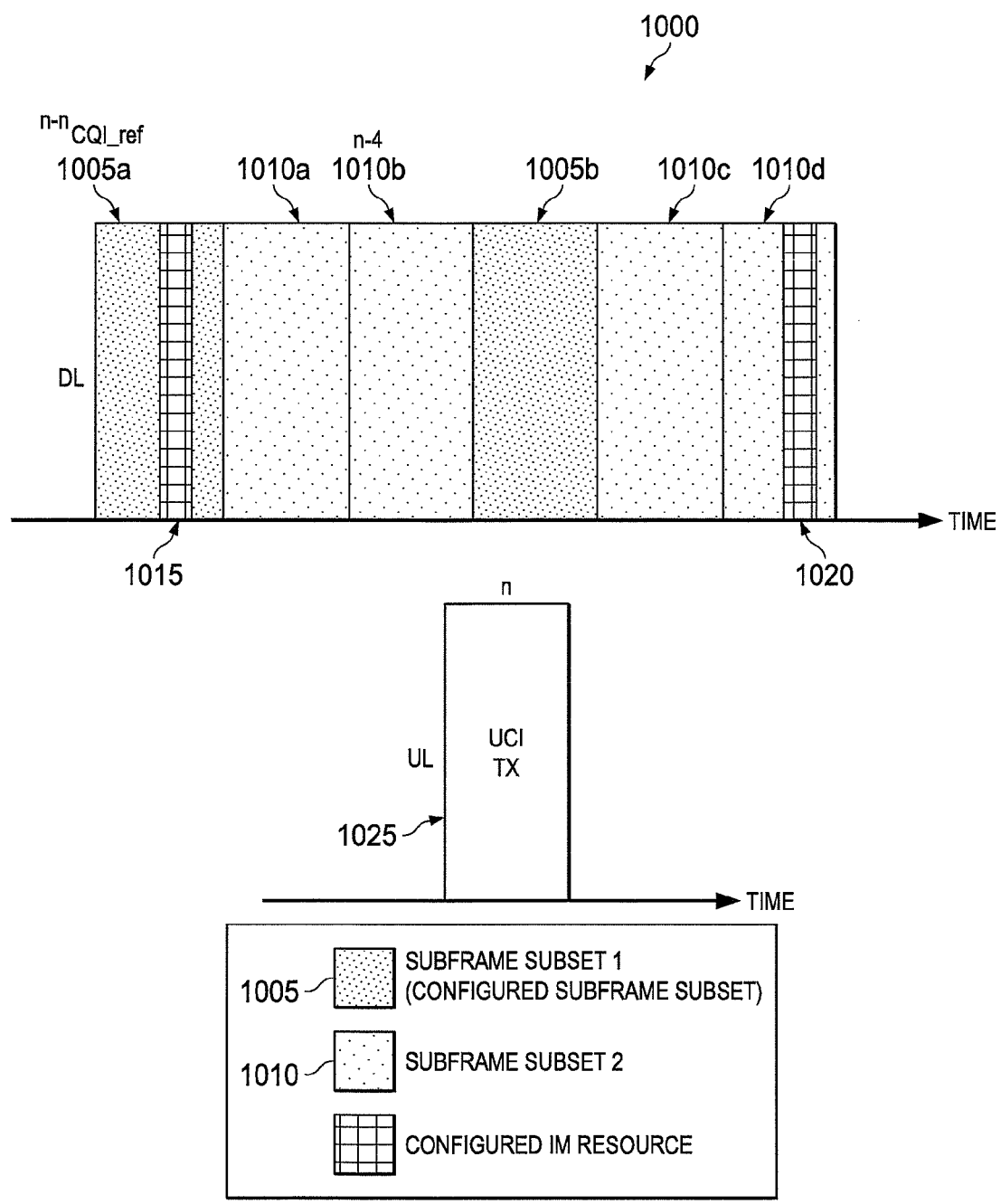
FIGS. 10A and 10B illustrate examples of a reference subframe with a configuration of IM resource and CSI subframe subsets in accordance with embodiments of the present disclosure.
Figure 10B:
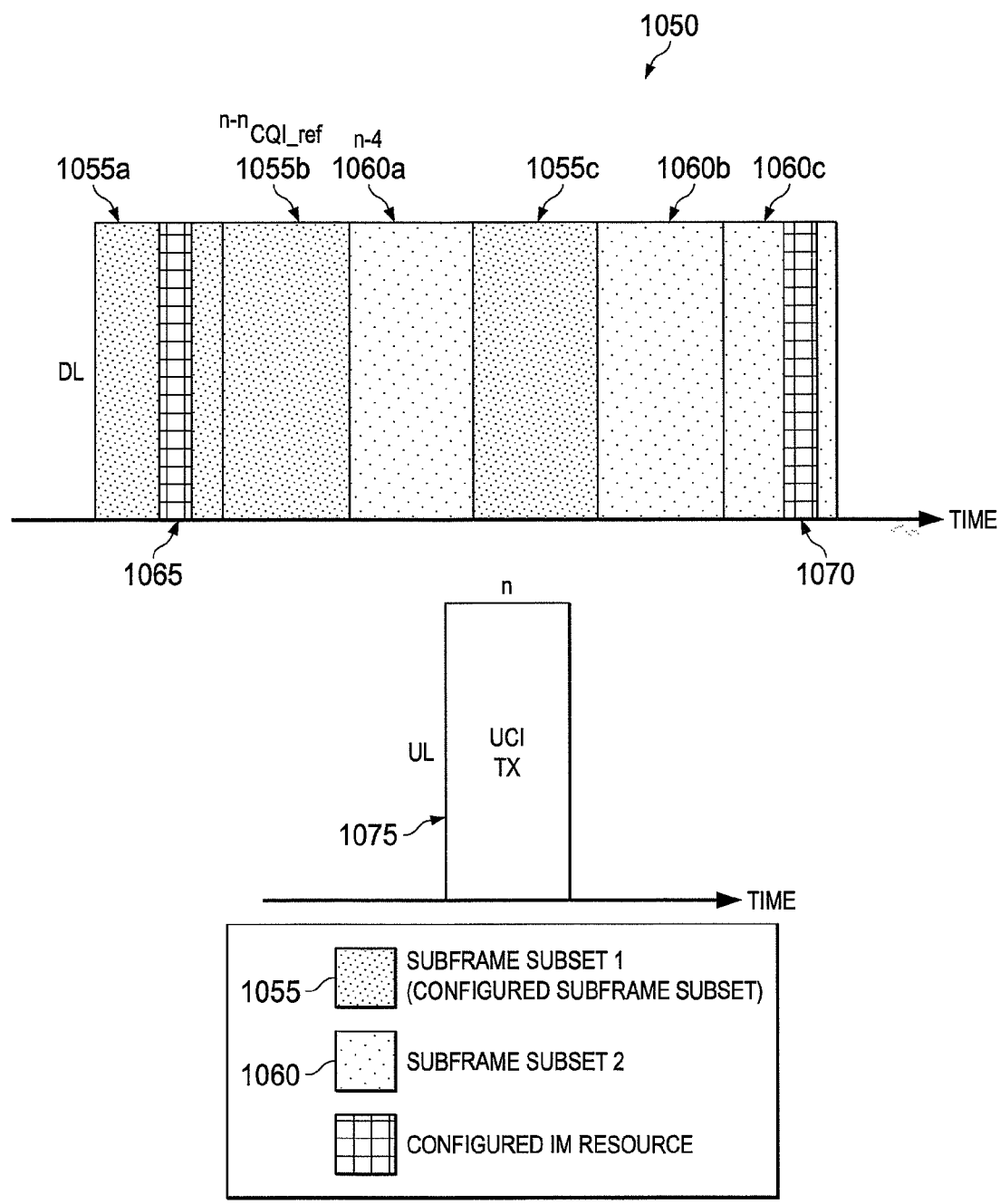

FIGS. 10A and 10B illustrate examples of a reference subframe with configuration of IMR and CSI subframe subsets in accordance with various embodiments of the present disclosure. The embodiments shown in FIGS. 10A and 10B are for illustration only. Other embodiments could be used without departing from the scope of the present disclosure.

In the embodiments shown in FIGS. 10A and 10B, the downlink transmissions to the UE have at least two different subsets, such as with enhanced Intercell Interference Coordination (eICIC), or other transmission modes (e.g., transmission mode 10). For such subframe subsets, the interference measurement is on the corresponding subframe subset as configured for that CSI request (i.e., the interference measurement is an element of the CSI subframe set linked to the periodic CSI report when that UE is configured with CSI subframe sets). In other words, the configured CSI-IM resource within the subframe subset belonging to the CSI reference resource is used to derive the interference measurement.

For example, as illustrated in FIG. 10A, two different types of subframe subsets 1005 and 1010 are present within the downlink subframes 1000 transmitted to the UE. Within each of the subframe subsets, the network configures IM resources 1015 and 1020 within the respective subframe subsets 1005 and 1010. For feedback reporting in the UCI transmission 1025, the UE uses the subframe subset belonging to the CSI reference resource to derive the interference measurement. As illustrated, for the CSI reference resource (i.e., $n_{CQI\_ref}$) being in subframe subset 1005 (i.e., in subframe 1005a), the UE uses the IM resource 1015 in the subframe 1005a (which is part of subframe subset 1005) to derive the interference measurement. For example, the UE measures interference using the IM resource 1015 to calculate a CQI value or values that are then reported as feedback in the UCI transmission 1025. Even though the IM resource 1020 in subframe 1010d may be closer in time or frequency to the UCI transmission 1025, the UE still uses the configured IM resource within the subframe subset belonging to the CSI reference resource to derive the interference measurement.

In another example, as illustrated in FIG. 10B, two different types of subframe subsets 1055 and 1060 are present within the downlink subframes 1050 transmitted to the UE. Within each of the subframe subsets, the network configures IM resources 1065 and 1070 within the respective subframe subsets 1055 and 1060. For feedback reporting in the UCI transmission 1075, the UE uses the subframe subset belonging to the CSI reference resource to derive the interference measurement. As illustrated, for the CSI reference resource (i.e., $n_{CQI\_ref}$) being in subframe subset 1055 (i.e., in subframe 1055a), the UE uses the IM resource 1065 in the subframe 1055a (which is part of subframe subset 1055) to derive the interference measurement. For example, the UE measures interference using the IM resource 1065 to calculate a CQI value or values which are then reported as feedback in the UCI transmission 1075. Even though the IM resource 1070 in subframe 1060c may be closer in time or frequency to the UCI transmission 1075, the UE still uses the configured IM resource within the subframe subset belonging to the CSI reference resource to derive the interference measurement.

Additionally, because the processing of the interference measurement (e.g., receiving the IM resource symbol, measuring interference, calculating a corresponding CQI value or values, etc.) may take time, the UE may actually pass up some configured IM resource that occurs closer in time to the UCI transmission 1025 or 1075 in order to insure accurate and timely reporting of the feedback associated with the interference measurement. The downlink and uplink transmissions illustrated in FIGS. 10A and 10B may be implemented in a TDD or FDD system.

In certain embodiments, with the IM resource configuration, the reference subframe is based on the intersection of the IM resource and the CSI subframe subset. This can be achieved by further modifying the definition of a valid downlink subframe. For example, in the time domain, the CSI reference resource can be defined by a single downlink subframe $n-n_{CQI\_ref}$ where, for periodic CSI reporting, $n_{CQI\_ref}$ is the smallest value greater than or equal to 4, such that it corresponds to a valid downlink subframe. Additionally, a downlink subframe in a serving cell shall be considered to be valid if: the downlink subframe is configured as a downlink subframe for that UE; except for transmission mode 9, the downlink subframe is not an MBSFN subframe; the downlink subframe does not contain a DwPTS field in case the length of DwPTS is 7680·$T_s$ and less; the downlink subframe does not fall within a configured measurement gap for that UE; and for periodic CSI reporting, it is an element of the CSI subframe set linked to the periodic CSI report when that UE is configured with CSI subframe sets and an element of a subframe set of the interference measurement resource linked to the periodic CSI report if the UE is configured with interference measurement resources.

With PUSCH based aperiodic feedback modes, higher UCI overhead can be supported than PUCCH based periodic feedback modes, whose capacity is limited by that supported by Format 3 (22 bits). This is suited for transmission of UCI corresponding to multiple CSI-RS resources in CoMP. Aperiodic feedback modes are captured provided in 3GPP TS 36.213. If no inter-CSI-RS resource feedback is supported, then no new modes need to be defined for aperiodic CSI. DCI Format 0 (or 4) supports a "CSI request field", which indicates whether aperiodic CSI is turned on and on which cells (e.g., carriers) CSI is to be reported as shown in Table 7.2.1-1A of 3GPP TS 36.213.

Similarly, a CSI request may be needed to indicate the set of CSI-RS resources for CoMP. In one exemplary embodiment, an independent CSI request field is defined for CoMP according to TABLE 6 below.

TABLE 6

| Value of CSI request field | Description |
| --- | --- |
| '00' | No aperiodic CSI report is triggered |
| '01' | Aperiodic CSI report is triggered for CSI-RS resource 1 (or any configured fixed CSI-RS resource or CSI configuration) |
| '10' | Aperiodic CSI report is triggered for a $1^{st}$ set of CSI-RS resources (or CSI configurations) configured by higher layers |
| '11' | Aperiodic CSI report is triggered for a $2^{nd}$ set of CSI-RS resources (or CSI configurations) configured by higher layers |

In certain embodiments, a jointly encoded CSI request field may be used. An example with 2-bit encoding is illustrated in TABLE 7 below. In this example, CoMP is only supported on the serving cell. The serving cell may be replaced by any fixed cell on which CoMP is configured.

TABLE 7

| Value of CSI request field | Description |
| --- | --- |
| '00' | No aperiodic CSI report is triggered |
| '01' | Aperiodic CSI report is triggered for serving cell c and $1^{st}$ set of CSI-RS resources (or CSI configurations) configured by higher layers on serving cell c |
| '10' | Aperiodic CSI report is triggered for serving cell c and $2^{nd}$ set of CSI-RS resources (or CSI configurations) configured by higher layers on serving cell c |
| '11' | Aperiodic CSI report is triggered for a $1^{st}$ set of serving cells configured by higher layers (based on a single CSI-RS resource per each cell that is configured by higher layers) |

The set of feedback modes in Table 7.2.1-1A of 3GPP TS 36.213 can be reused, and if more than one CSI-RS resources are configured, the UE aggregates the per-CSI-RS feedback corresponding to the modes configured on each CSI-RS resource. For example, if mode 1-2 is configured on CSI-RS resource 1 and mode 2-2 on CSI-RS resource 2, the UE aggregates corresponding CSI.

In certain embodiments, some inter-CSI-RS feedback may be supported. Examples of inter-CSI-RS feedback include: aligned RI feedback, aggregate CQI feedback, aggregate PMI, and inter-TP phase feedback.

In one exemplary embodiment, the aperiodic modes are defined for CoMP with two CSI-RS resources when one or more inter-CSI-RS resource feedback modes are supported as illustrated in TABLE 8 below.

For a wideband inter-CSI-RS phase, in one example, the UE reports a wideband inter-CSI-RS resource phase feedback corresponding to the two CSI-RS resources of the two CSI configurations.

The mode 3-3 is for higher layer configured subband feedback for two CSI configurations. In this feedback mode, a UE reports a wideband CQI value which is calculated assuming transmission on set S subbands per CSI configuration. The UE also reports one subband CQI value for each set S subband and each CSI configuration. The subband CQI

TABLE 8

| | | (PMI Feedback Type, CoMP Feedback Type) | | | | | |
|---|---|---|---|---|---|---|---|
| | | No PMI, Single CSI-RS Resource | Single PMI, Single CSI-RS Resource | Multiple PMI, Single CSI-RS Resource | No PMI, Two CSI-RS Resource | Single PMI, Two CSI-RS Resource | Multiple PMI, Two CSI-RS Resource |
| PUSCH CQI Feedback Type | Wideband (wideband CQI) | | | Mode 1-2 | | | Mode 1-5 |
| | UE Selected (subband CQI) | Mode 2-0 | | Mode 2-2 | Mode 2-3 | | Mode 2-5 |
| | Higher Layer-configured (subband CQI) | Mode 3-0 | Mode 3-1 | | | Mode 3-3 | Mode 3-4 |

The individual mode definitions and embodiments to support inter-CSI-RS resource feedback are further described below. The CSI configuration is defined above and can be used interchangeably with CSI-RS resources (if they share the same interference measurement resource configuration).

The mode 2-3 is for a UE-selected subband feedback for two CSI configurations. In this feedback mode, the UE selects a first set of M preferred subbands of size k (where k and M are given in Table 7.2.1-5, 36.213 for each system bandwidth range) within the set of subbands S for the first CSI configuration. The UE selects a second set of M preferred subbands of size k within the set of subbands S for the second CSI configuration. The UE also reports one CQI value reflecting transmission only over the first M selected subbands determined in the previous step for the first CSI configuration and another CQI value reflecting transmission only over the second M selected subbands determined in the previous step for the second CSI configuration. Each CQI represents channel quality for the first codeword of the corresponding CSI configuration, even when RI>1. Additionally, the UE reports one wideband CQI value, which is calculated assuming transmission on set S subbands for each CSI configuration. The wideband CQI represents channel quality for the first codeword of the corresponding CSI configuration, even when RI>1.

For the same rank, in one example, a single RI is reported for both CSI configurations. For transmission mode 3, the reported CQI values are calculated conditioned on the reported RI. For other transmission modes, the reported CQI values are reported conditioned on rank 1.

For wideband aggregate CQI, in one example, the UE also reports one wideband aggregate CQI value, which is calculated assuming joint transmission on set S subbands from the two CSI resources. In another example, the aggregate CQI is differentially encoded with the per-CSI-RS wideband CQI.

value is calculated assuming transmission only in the subband. Both the wideband and subband CQI represent channel quality for the first codeword, even when RI>1.

For the same rank, in one example, a single RI is reported for both CSI configurations. For transmission mode 3, the reported CQI values are calculated conditioned on the reported RI. For other transmission modes, the reported CQI values are reported conditioned on rank 1.

For wideband aggregate CQI, in one example, the UE shall also report one wideband aggregate CQI value, which is calculated assuming joint transmission on set S subbands from the two CSI resources. In another example, the aggregate CQI is differentially encoded with the per-CSI-RS wideband CQI.

For subband aggregate CQI, in one example, the UE shall also report one subband aggregate CQI value for each set S subband, which is calculated assuming joint transmission from the two CSI-RS resources. In another example, the subband aggregate CQI is differentially encoded with the wideband aggregate CQI. The subband differential aggregate CQI offset level is equal to the subband aggregate CQI index minus the wideband aggregate CQI index. A mapping of subband differential aggregate CQI value to offset level is provided in TABLE 9 below.

TABLE 9

| Subband differential CQI value | Offset level |
|---|---|
| 0 | 0 |
| 1 | 1 |
| 2 | ≥2 |
| 3 | ≤−1 |

The mode 3-4 is for higher layer configured subband PMI/CQI feedback for two CSI configurations. In this feedback mode, a single precoding matrix is selected for each CSI configuration from the codebook subset of the corresponding CSI configuration assuming transmission on set S subbands. A UE reports one subband CQI value per codeword for each set S subband and for each CSI configuration which is calculated assuming the use of the single precoding matrix corresponding to the CSI configuration in all subbands and assuming transmission in the corresponding subband. A UE reports a wideband CQI value per codeword per CSI configuration, which is calculated assuming the use of the single precoding matrix corresponding to the CSI configuration in all subbands and transmission on set S subbands. The UE reports the selected single precoding matrix indicator per CSI configuration except for transmission mode 9 with 8 CSI-RS ports configured in which case a first and second precoding matrix indicator are reported corresponding to the selected single precoding matrix per CSI configuration.

For the same rank, in one example, a single RI is reported for both CSI configurations. For transmission modes 4, 8, and 9, the reported PMI and CQI values are calculated conditioned on the reported RI. For other transmission modes, the reported PMI and CQI values are reported conditioned on rank 1.

For wideband aggregate CQI, in one example, a UE reports a wideband aggregate CQI value per codeword, which is calculated assuming joint transmission using the single precoding matrix corresponding to each CSI configuration in all subbands and transmission on set S subbands.

For subband aggregate CQI, in one example, a UE reports a subband aggregate CQI value per codeword for each set S subband, which is calculated assuming joint transmission using the single precoding matrix corresponding to each CSI configuration in the corresponding subband.

For wideband Inter CSI-RS resource phase, in one example, the UE shall report a wideband inter-CSI-RS resource phase feedback corresponding to the two CSI-RS resources corresponding to the CSI configurations assuming joint transmission on set S subbands.

For wideband aggregate CQI with phase feedback, in one example, a UE shall report a wideband aggregate CQI value per codeword, which is calculated assuming joint transmission using the single precoding matrix corresponding to each CSI configuration in all subbands, using the single wideband inter-CSI-RS resource phase feedback, and transmission on set S subbands.

For subband aggregate CQI with phase feedback, in one example, a UE shall report a subband aggregate CQI value per codeword for each set S subband, which is calculated assuming joint transmission using the single precoding matrix corresponding to each CSI configuration, using the single wideband inter-CSI-RS resource phase feedback in the corresponding subband. In another example, the subband aggregate CQI is differentially encoded with the wideband aggregate CQI.

The mode 1-5 is for wideband feedback for two CSI resources. In this feedback mode, for each subband, a preferred precoding matrix for each CSI configuration is selected from the codebook subset of the corresponding CSI configuration assuming transmission only in the subband. For each CSI configuration, a UE reports one wideband CQI value per codeword, which is calculated assuming the use of the corresponding selected precoding matrix in each subband and transmission on set S subbands. For each CSI configuration, the UE reports the selected precoding matrix indicator for each set S subband except for transmission mode 9 with 8 CSI-RS ports configured in which case a first precoding matrix indicator $i_1$ is reported for the set S subbands and a second precoding matrix indicator $i_2$ is reported for each set S subband. The subband size is defined in Table 7.2.1-3 in 3GPP TS 36.213.

For the same rank, in one example, a single RI is reported for both CSI configurations. For transmission modes 4, 8, and 9, the reported PMI and CQI values are calculated conditioned on the reported RI. For other transmission modes, the reported PMI and CQI values are reported conditioned on rank 1.

For subband inter-CSI-RS phases, in one example, an inter-CSI-RS phase is reported per subband for assuming transmission only in the subband.

For wideband aggregate CQI with subband inter-CSI-RS phase, in one example, a UE reports one aggregate wideband CQI value per codeword, which is calculated assuming joint transmission and the use of the corresponding selected precoding matrix in each subband, inter-CSI-RS phase per subband and transmission on set S subbands.

The mode 2-5 is for UE selected subband feedback for two CSI configurations and multiple PMI. In this feedback mode, the UE performs joint selection of the set of M preferred subbands of size k within the set of subbands S and a preferred single precoding matrix selected from the codebook subset that is preferred to be used for transmission over the M selected subbands. The M preferred subbands and the associated single precoding matrix are obtained for each CSI configuration. For each CSI configuration, the UE reports one CQI value per codeword reflecting transmission only over the corresponding selected M preferred subbands and using the same corresponding selected single precoding matrix in each of the M subbands. Except for transmission mode 9 with 8 CSI-RS ports configured, for each CSI configuration, the UE also reports the corresponding selected single precoding matrix indicator preferred for the M selected subbands. For each CSI configuration, a UE also reports the corresponding selected single precoding matrix indicator for all set S subbands. For transmission mode 9 with 8 CSI-RS ports configured, for each CSI configuration, a UE reports a corresponding first precoding matrix indicator for all set S subbands. For each CSI configuration, a UE also reports a corresponding second precoding matrix indicator for all set S subbands and another corresponding second precoding matrix indicator for the M selected subbands. For each CSI configuration, a single precoding matrix is selected from the codebook subset of the corresponding CSI configuration assuming transmission on set S subbands. For each CSI configuration, a UE reports an associated wideband CQI value per codeword, which is calculated assuming the use of the corresponding single precoding matrix in all subbands and transmission on set S subbands.

In one example, a single RI is reported for both CSI configurations. For transmission modes 4, 8, and 9, the reported PMI and CQI values are calculated conditioned on the reported RI. For other transmission modes, they are reported conditioned on rank 1.

For wideband aggregate CQI, in one example, a UE reports a wideband aggregate CQI value per codeword, which is calculated assuming joint transmission using the single precoding matrix corresponding to each CSI configuration in all subbands and transmission on set S subbands.

For wideband inter-CSI-RS resource phase, in one example, the UE reports a wideband inter-CSI-RS resource phase feedback corresponding to the two CSI-RS resources corresponding to the CSI configurations assuming joint transmission on set S subbands.

For wideband aggregate CQI with wideband phase, in one example, a UE reports a wideband aggregate CQI value per codeword, which is calculated assuming joint transmission using the single precoding matrix corresponding to each CSI configuration in all subbands, using the wideband inter-CSI-RS resource phase feedback, and transmission on set S subbands.

For selection of M subbands assuming joint transmission, in one example, the UE performs joint selection assuming joint transmission from two CSI configurations of the set of M preferred subbands of size k within the set of subbands S and a preferred single precoding matrix selected from the codebook subset for each CSI configuration that is preferred to be used for transmission over the M selected subbands.

For per-CSI-RS resource CQI over the selected M subbands, in one example, the UE reports one CQI value per codeword reflecting joint transmission only over the corresponding selected M preferred subbands for joint transmission and using the same corresponding selected single precoding matrix for each CSI configuration in each of the M subbands from the previous step.

For inter-CSI-RS phase for selected M subbands, in one example, the UE reports a single inter-CSI-RS resource phase feedback assuming joint transmission over the selected M preferred subbands for joint transmission.

For aggregate CQI on selected M subbands, in one example, the UE reports one aggregate CQI value per codeword reflecting joint transmission only over the corresponding selected M preferred subbands for joint transmission and using the corresponding selected single precoding matrix for each CSI configuration, and the selected single inter-CSI-RS resource phased feedback, in each of the M subbands.

In one example, the selected single RI for both CSI configurations, as defined in the above feedback modes, may be based on the CSI configuration with the largest wideband CQI. In another example, the selected single RI is based on the CSI configuration with the largest RI. In another example, the RI is based on one of the CSI configurations, which can be predefined or configured by higher layers or fixed (e.g., configuration 1).

For aggregate CQI, the assumed IM resource for interference measurement may be separately configured by higher layers or implicitly defined (e.g., measure all the interference other than the CSI-RS resources corresponding to the two CSI configurations).

If both the CSI configurations correspond to the same CSI-RS resource but different IMR resources, then some of the inter-CSI-RS resource feedback need not be supported. There is no need to report aggregate CQI, inter-CSI-RS phase feedback, or single rank feedback. In one example, if there is no need to report this feedback, then these reports may be dropped and instead replaced by other reports. For example, multiple rank feedback can be supported or CQI of the individual CSI configurations may be encoded differentially. However, if the CSI configurations share the same CSI resource, it may not be preferable to use the modes defined above. More generally, in each of the feedback modes defined, reports corresponding to more than two CSI configurations can be supported. Similar definitions for the inter-CSI-RS resource feedback may be used with simple extensions of definitions described herein.

Embodiments of the present disclosure include different types of CSI reporting to avoid excessive computational complexity at the UE.

In LTE Release 8, a UE reports CSI corresponding to measurement on CRS and no carrier aggregation or CoMP was supported. Therefore, a UE is not required to report CSIs of multiple serving cells (or carriers) and/or multiple CSI configurations (i.e., a CoMP hypothesis). Hence the timing of CSI reporting is provisioned for single CSI transmission. Further with support of eICIC, multiple (e.g., two) sub-frame subsets can be configured for independent CSI measurements. The number of potential CSI hypothesis at the UE could be as large as 3 (i.e., the maximum number of CSI configurations)×5 (i.e., the maximum number of serving cells)×2 (i.e., max number of sub-frame subsets)=30. For convenience, the disclosure refers to a CSI corresponding to the triplet (i.e., serving cell, CSI configuration, CSI sub-frame subset) as a CSI process.

If the measurements are configured with sufficiently low periodicity and appropriate offsets between reports, then the UE receiver complexity need not support simultaneous measurements of many CSI processes within short time periods. However, the timing configuration of different CSI processes is completely flexible and there is currently no limit on the number of them that can be simultaneously configured.

Embodiments of the present disclosure include some rules defined for different types of CSI reporting to avoid excessive computational complexity at the UE.

In one embodiment, for aperiodic reporting, a UE is requested CSI using CSI_request field in an uplink grant. The corresponding uplink transmission takes place after four subframes. In an aperiodic request, a network can request feedback for arbitrary number of CSI processes. Currently, the CSI subframe subset corresponding to an aperiodic request is implicitly related to the subframe with UL grant. In other words, the feedback corresponds to the subframe subset that the subframe with UL grant belongs to. Therefore, an aperiodic request can request feedback for a maximum of 3*5*1=15 CSI processes.

Figure 11:
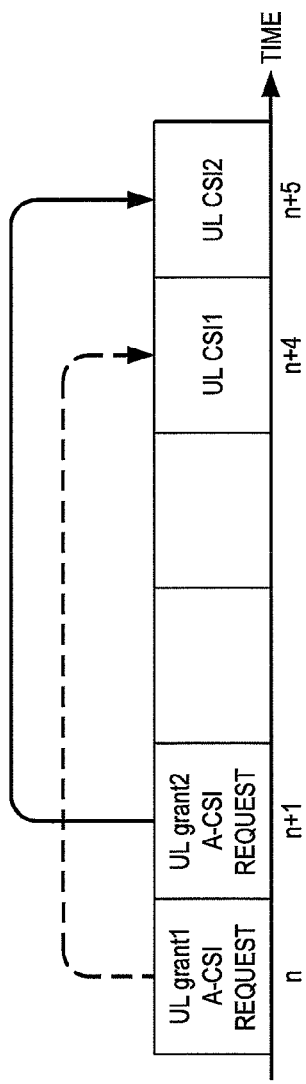
FIG. 11 illustrates a process for CSI feedback reporting by a UE in a coordinated multipoint communication system in accordance with embodiments of the present disclosure.

FIG. 11 illustrates UL grant subframes with aperiodic requests and the CSI subframe subsets corresponding to the aperiodic requests. As illustrated, over a window of length 4 from n+1 to n+4, a UE has to process as many as 30 CSI processes, assuming n and n+1 correspond to different subframe subsets. Although it is very unlikely that a network would setup or benefit from such large amount of feedback, various embodiments of the present disclosure design the rules for the UE behavior to support even the worst case increase in complexity as follow. The implementation complexity and cost can be optimized if some restrictions are known for the UE design.

For a single CSI request, in one embodiment, a UE is not expected to receive greater than $N_{threshold}$ reports as part of aperiodic CSI request. If the limit is exceeded then the UE behavior is unspecified or defined to be implementation dependent. In another embodiment, if number of CSI processes in an aperiodic request is greater than $N_{threshold}$, then the UE can drop the CSI transmission. In certain embodiments, if number of CSI processes in an aperiodic request is greater than $N_{threshold}$, then the UE can drop some reports and send other reports. In another embodiment, if the number of CSI processes in an aperiodic request is greater than $N_{threshold}$, then one or more parameters related to uplink CSI transmission can be implicitly modified. In one example, the delay to UL CSI transmission from the uplink grant can be 8 subframes, instead of 4 subframes.

For a single CSI request, certain embodiments according to the present disclosure include that multiple successive UL CSI transmissions are configured for the CSI report. In one example, if the number of CSI processes in an aperiodic request is greater than a $N_{threshold}$, then multiple successive UL CSI transmissions (i.e., multi-shot) can be setup. In another example, the UE is triggered with multiple successive UL CSI transmissions on reading an aperiodic request with number of CSI processes is greater than a $N_{threshold}$. In another example, additional signaling is used in aperiodic CSI request (e.g., as part of a bit-field) to indicate multi-shot UL CSI transmission.

As illustrated in FIG. 11, the processing complexity at the UE is related to the number of pending CSIs to be feedback. This is related to the most recent aperiodic CSI requests, within a certain window as described above.

For the multiple CSI requests, in one embodiment, a threshold can be defined that is based on the two or more aperiodic CSI requests. Further the multiplexing/dropping rules can be defined based on the two or more aperiodic CSI requests. More generally, the embodiment can be described as follows.

If the UE has pending requests for more than $N_{threshold}$ processes at a given time, then one or more of the following embodiments for sending CSI can apply as opposed to sending the corresponding CSI in the UL sub-frame n+4. In certain embodiments, the UE behavior is not specified, and the UE implementation can decide how, or if, to transmit UL CSI(s). In certain embodiments, the UE drops all the pending aperiodic CSI requests. In certain embodiments, the UE drops the most recent aperiodic CSI request; in certain embodiments, the UE drops the oldest aperiodic CSI request. In certain embodiments, the UE drops CSI of one or more CSI processes of one or more aperiodic requests. In certain embodiments, the UE drops all the CSI requests, except that of serving cell. In certain embodiments, the UE drops all the CSI requests except that of CSI process corresponding to lower CSI configuration index on each cell. In certain embodiments, the UE uses the dropping rules proposed above for case of periodic CSI collisions to the combined set of CSI processes.

Embodiments according to the present disclosure include that a CSI transmission can be configured to be delayed in certain situations.

For FDD (i.e., frame structure type 1 in LTE), in one embodiment, if the number of CSI processes in an aperiodic request is greater than $N_{threshold}$, then the UE transmits the uplink at subframe n+k, where k is greater than 4. In another example, k is a multiple of 4. In another example, k=8. In one embodiment, the retransmissions of the uplink transmission follow the same timing as before with reference to the first uplink transmission, which is the delayed transmission. In one example, the delay k can be configurable by higher layer signaling. In another embodiment, the UE transmits the uplink at subframe n+k, where k is greater than 4.

Figure 12:
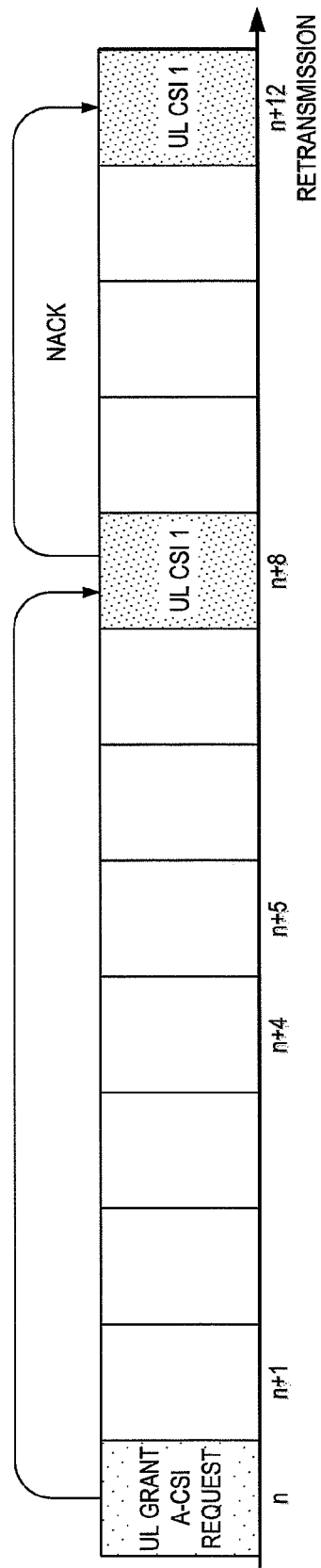
FIG. 12 illustrates transmitting a UL CSI in accordance with embodiments of the present disclosure.

FIG. 12 illustrates transmitting a UL CSI according to one embodiment of present disclosure. An aperiodic CSI request is received at subframe n and the corresponding UL CSI 1 is transmitted in subframe N+8. However, a NACK transmission responding to UL CSI 1 is received and UL CSI 1 is retransmitted in subframe n+12.

With aperiodic CSI request on PUSCH, a UE performs aperiodic CSI reporting using the PUSCH in subframe n+k on serving cell, upon decoding in subframe n either: an uplink DCI format, or a Random Access Response Grant, for serving cell if the respective CSI request field is set to trigger a report and is not reserved. If the CSI request field is 1 bit, a report is triggered for serving cell if the CSI request field is set to '1'.

If the CSI request field size is 2 bits, a report is triggered according to the value in Table 10 corresponding to aperiodic CSI reporting. TABLE 10 illustrates the CSI Request field for PDCCH with uplink DCI format in UE specific search space.

TABLE 10

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

It is noted that PDCCH with DCI formats used to grant PUSCH transmissions as given by DCI format 0 and DCI format 4 are herein referred to as uplink DCI format when common behavior is addressed.

When the CSI request field from an uplink DCI format is set to trigger a report, for FDD k=4, and for TDD UL/DL configuration 1-6, k is given in Table 8-2. For TDD UL/DL configuration 0, if the MSB of the UL index is set to 1 and LSB of the UL index is set to 0, k is given in Table 8-2; or if MSB of the UL index is set to 0 and LSB of the UL index is set to 1, k is equal to 7; or if both MSB and LSB of the UL index is set to 1, k for TDD configurations 0-6 is given in TABLE 11 below.

TABLE 11

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For TDD (i.e., frame structure type 2 in LTE), in one embodiment, if the number of CSI processes in an aperiodic request is greater than $N_{threshold}$, then the UE transmits corresponding CSI on the uplink at subframe n+D+$k_1$, where $k_1$ is defined above.

When the CSI request field from a Random Access Response Grant is set to trigger a report and is not reserved, k is equal to $k_1$ if the UL delay field in section 6.2 of TS 36.211 is set to zero, where k is given in section 6.1.1. The UE shall postpone aperiodic CSI reporting to the next available UL sub-frame if the UL delay field is set to 1.

In certain embodiments, if the number of CSI processes in an aperiodic request is greater than $N_{threshold}$, then the UE transmits corresponding CSI on uplink at subframe n+D+$k_2$, where $k_2$ may be defined with a new table similarly to table 11. In certain embodiments, the entries in the table are all greater than 4 to provide additional time for CSI computation at the UE. In certain embodiments, the delay D can be configurable by higher layer signaling. In one example, a UE is not expected to receive more than one aperiodic CSI report request for a given subframe.

The embodiments described above have been developed in case the UE complexity burden can be too high. The condition defined is based on number of CSI processes being greater than a certain threshold value. More generally the embodiments can also apply when the condition is defined in different ways, some examples of which include: conditioned on the configuration of CoMP+CA together for the UE, conditioned on a network configured threshold, and UE capability.

With periodic transmission on PUCCH, a single CSI process (or a small number of simultaneous reports, example, two or three) can be configured per periodic PUCCH reporting. Each periodic PUCCH report has associated timing parameters (i.e., periodicity, offset) described.

It is noted that with periodic CSI, there could be the case where UL transmissions for multiple P-CSIs can collide with each other in a subframe. In such a subframe, the colliding CSIs can be handled so that one or more P-CSIs are transmitted and others are dropped. Some of the previous embodiments outlined in this disclosure can be used for this purpose.

Figure 13:
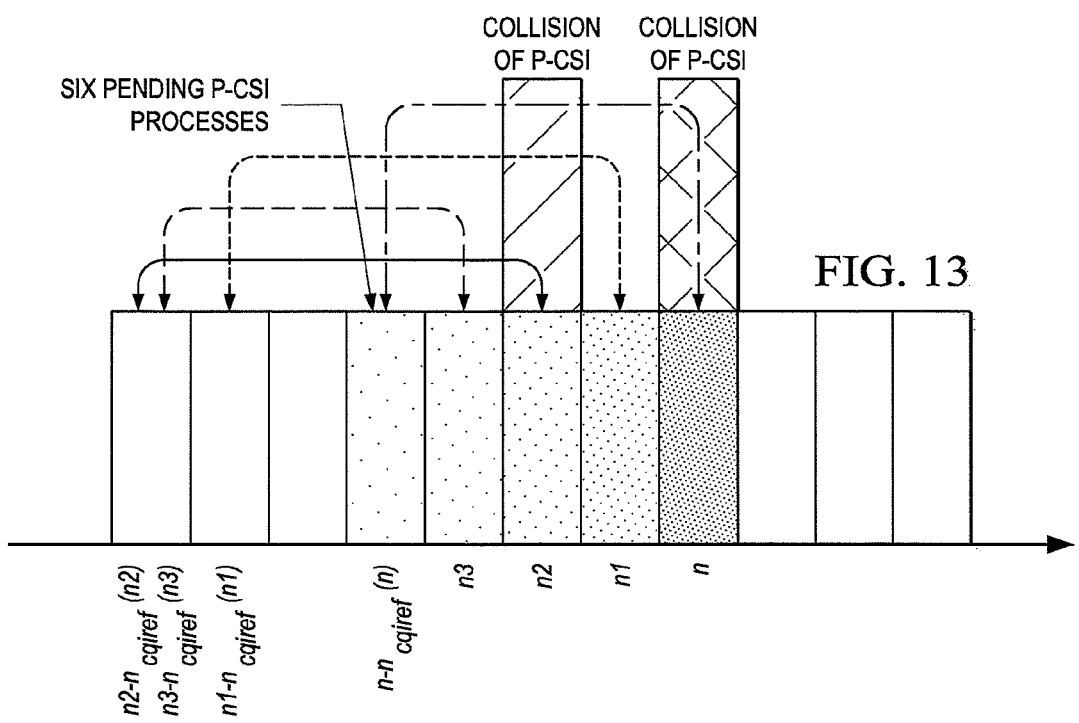
FIG. 13 illustrates collision of the periodic CSI reporting in accordance with embodiments of the present disclosure.

FIG. 13 illustrates collision of the periodic CSI reporting according to embodiments of the present disclosure. The embodiment of the CSI reporting shown in FIG. 13 is for illustration only. Other embodiments could be used without departing from the scope of the present disclosure.

As illustrated, sub-frame $n-n_{cqiref}(n)$ corresponds to a reference sub-frame for CSI corresponding to P-CSI to be transmitted in subframe n. Likewise, sub-frame $n1-n_{cqiref}(n1)$ corresponds to reference subframe for P-CSI in sub-frame n1; and sub-frame $n2-n_{cqiref}(n2)$ and $n3-n_{cqiref}(n3)$ corresponds to reference subframe for P-CSIs in subframe n2n2 and subframe n3.

At a given subframe a UE can have certain number of pending CSI processes as illustrated in the figure. For example, at sub-frame $n-n_{cqiref}(n)$, which corresponds to reference sub-frame for CSI corresponding to P-CSI to be transmitted in subframe n, there are six pending P-CSI processes. In other words UE has six ongoing CSI computations at sub-frame $n-n_{cqiref}(n)$.

As illustrated, the P-CSI feedback transmitted at subframe n1, corresponding to sub-frame $n1-n_{cqiref}(n1)$ collides with another P-CSI feedback. In addition, the P-CSI feedback transmitted at subframe n1, corresponding to sub-frame $n2-n_{cqiref}(n2)$ collides with another P-CSI feedback.

In certain embodiments, a UE is not expected to receive greater than a $N_{threshold}$ pending CSI processes. If the limit is exceeded then the UE behavior is unspecified or defined to be implementation dependent. In certain embodiments, if number of pending CSI processes is greater than the $N_{threshold}$, then the UE can drop the CSI transmissions. In certain embodiments, if number of pending CSI processes in an aperiodic request is greater than the $N_{threshold}$, then the UE can drop some reports and send some reports.

If the UE has pending requests for more than $N_{threshold}$ processes at a given time, then one or more of the following procedures for sending CSI can apply as opposed to sending the corresponding CSI in corresponding UL sub-frames (n+4): in one example, UE behavior is not specified; in this case, UE implementation can decide how/if to transmit UL CSI; in another example, a UE drops all the pending periodic CSI requests; in another example, a UE drops the periodic CSI request with the most recent CSI reference subframe; in another example, a UE drops the periodic CSI request with the oldest CSI reference subframe; in another example, a UE drops the periodic CSI request with the earliest upcoming uplink transmission; in another example, a UE drops the periodic CSI request with the furthest upcoming uplink transmission; in another example, a UE drop CSI of one or more CSI processes of one or more periodic requests; in another example, a UE drops all the CSI requests, except that of serving cell; in another example, a UE drops all the CSI requests except that of CSI process corresponding to lower CSI configuration index on each cell; in another example, a UE uses the dropping rules proposed above for case of periodic CSI collisions to the combined set of CSI processes; or in another example, a UE drops the CSI request prioritizing based on the type of the corresponding reports; in another example, the CSI with PUCCH reporting type (1, 1a, 2, 2b, 2c, or 4) has lower priority than CSI report with PUCCH reporting type 3, 5, 6, or 2a; in another example, a UE drops the CSI requests by prioritizing based on the period of transmission (Nperiod); and, in another example, the CSI reports with the lowest Nperiod is dropped.

In certain embodiments, a UE can drop the periodic CSI request with the furthest uplink transmission, which essentially implies that no additional CSI processes are added to the UE link adaptation block pipeline, while there are a certain number of CSI computations in progress.

In certain embodiments, one or more of the above procedures can be combined. For example, the CSI requests can be down-selected by prioritizing based on the PUCCH reporting types and then the dropping of the request with the furthest uplink transmission can be applied.

In certain embodiments, the behaviors or procedures defined above for aperiodic and periodic reporting when multiple CSI reports are configured is dependent on a UE capability. Such capability may be known to the network or the information could be signaled by higher layers signaling.

In addition, one or more aspects of the embodiments described above can apply to the combined CSI requests of both periodic and aperiodic CSI requests.

If the UE has pending requests for more than $N_{threshold}$ CSI processes at a given time including periodic and aperiodic requests, then one or more of following procedures for sending CSI can apply as opposed to sending the corresponding CSI in corresponding UL sub-frames (n+4); in one example, the UE behavior is not specified and the UE implementation can decide how/if to transmit UL CSI; in another example, a UE drops all the pending periodic CSI requests; in another example, a UE drops all the pending aperiodic CSI requests; in another example, a UE drops the periodic CSI request with the most recent CSI reference subframe; in another example, a UE drops the periodic CSI request with the oldest CSI reference subframe; in another example, a UE drops the periodic CSI request with the earliest upcoming uplink transmission; in another example, a UE drops the periodic CSI request with the furthest upcoming uplink transmission; in another example, a UE drops CSI of one or more CSI processes of one or more periodic requests; in another example, a UE drop all the CSI requests, except that of serving cell; in another example, a UE drops all the CSI requests except that of CSI process corresponding to lower CSI configuration index on each cell; in another example, a UE uses the dropping rules proposed earlier for case of periodic CSI collisions to the combined set of CSI processes; in another example, a UE drops the CSI request prioritizing based on the type of the corresponding reports; in another example, the CSI with PUCCH reporting type 1, 1a, 2, 2b, 2c, or 4 has lower priority than CSI report with PUCCH reporting type 3, 5, 6, or 2a; in another example, a UE drops the CSI requests by prioritizing based on the period of transmission (Nperiod); in another example, the reports with the lowest Nperiod is dropped; in another example, a UE drops all the periodic requests and applies the rules defined above for aperiodic CSI requests.

If the UE has pending requests for more than $N_{threshold}$ processes in the aperiodic CSI request at a given time, then one or more of following procedures for sending CSI applies as opposed to sending the corresponding CSI in UL subframes (n+4): in one embodiment, the UE behavior is not specified; in this case UE implementation can decide how/if to transmit UL CSI; in another embodiment, a UE drops all the pending aperiodic CSI requests; in another embodiment, a UE drops the most recent aperiodic CSI request; in another embodiment, a UE drops the oldest aperiodic CSI request; in another embodiment, a UE drops CSI of one or more CSI processes of one or more aperiodic requests; in another embodiment, a UE drops all the CSI requests, except that of serving cell; and in another embodiment, a UE drops all the CSI requests except that of CSI process corresponding to lower CSI configuration index on each cell.

Embodiments of the present disclosure include UE complexity reduction with constraints on valid/reference subframes. The reference subframe is defined as follows: in the time domain, the CSI reference resource is defined by a single downlink subframe $n-n_{CQI\_ref}$, where for periodic CSI reporting $n_{CQI\_ref}$ is the smallest value greater than or equal to 4, such that it corresponds to a valid downlink subframe; and where for aperiodic CSI reporting $n_{CQI\_ref}$ is such that the reference resource is in the same valid downlink subframe as the corresponding CSI request in an uplink DCI format.

The reference subframe represents the subframe until which the measurements corresponding to the reported CQI are expected to be accumulated (i.e., channel/interference history until this subframe). Further, $n_{CQI\_ref}$ is the window of time available to a UE for performing CSI computation.

The smallest value of $n_{CQI\_ref}$ is referred to as $n_{CQI\_ref\_min}$, which represents the minimum value of $n_{CQI\_ref}$ and is equal to 4 in the LTE Release 10. The above definition can be rewritten as follows if this is made variable. In the time domain, the CSI reference resource is defined by a single downlink subframe $n-n_{CQI\_ref}$, where for periodic CSI reporting $n_{CQI\_ref}$ is the smallest value greater than or equal to $n_{CQI\_ref\_min}$, such that it corresponds to a valid downlink subframe; where for aperiodic CSI reporting $n_{CQI\_ref}$ is such that the reference resource is in the same valid downlink subframe as the corresponding CSI request in an uplink DCI format.

Whether a reference resource is in the same valid downlink subframe is determined based on Table 4.2-2 of 3GPP TS 36.211 as reproduced in TABLE 12 below.

downlink subframe $n-n_{CQI\_ref}$, where for periodic CSI reporting $n_{CQI\_ref}$ is the smallest value greater than or equal to $n_{CQI\_ref\_min}$, such that it corresponds to a valid downlink subframe; where for aperiodic CSI reporting $n_{CQI\_ref}$ is the smallest value greater than or equal to $n_{CQI\_ref\_min}$, such that it corresponds to a valid downlink subframe.

One possibility to alleviate the UE complexity is to relax the definitions of valid subframes and $n_{CQI\_ref\_min}$. In certain embodiments, the set of valid subframes can be further defined to be a subset of the available downlink subframes. In certain embodiments, such subset of valid subframes could be based on one or more of the following: One or more of the non-zero power CSI-RS configuration parameters, including resourceconfig, subframeconfig, one or more zero-power CSI-RS configuration parameters, one or more IMR configuration parameters, including resourceconfig, subframeconfig, the total number of CSI processes configured, the total number of periodic CSI processes configured or the UE, the total number of aperiodic CSI processes configured for the UE, the ABS or the subframe subset configuration, the aperiodic CSI configuration by higher layers, the periodic CSI configuration by higher layers; the number of serving cells configured, the number of subframe subsets configured; the type of reporting (i.e., aperiodic or periodic), and UE capability.

More generally the location information of the valid subframes can be configured by higher layers. For example, a higher layer configuration can indicate a set of valid subframes with a certain periodicity and a subframe offset. In other words, resourceconfig, subframeconfig can be indicated for defining the valid subframes.

In certain embodiments, the higher layer configuration could indicate which of the one or more CSI-RS configurations (NZP, ZP, IMR) must be used for deriving the set of valid subframes.

In certain embodiments, the value of $n_{CQI\_ref}$ or $n_{CQI\_ref\_min}$ is determined based one or more of the following: one or more of the non-zero power CSI-RS configuration parameters, including resourceconfig, subframeconfig, one or more zero-power CSI-RS configuration parameters, one or more IMR configuration parameters, including resourceconfig, subframeconfig, the total number of CSI processes configured, the total number of periodic CSI processes configured or the UE, the total number of aperiodic CSI processes configured for the UE, the ABS or the subframe subset configuration, the aperiodic CSI configuration by higher layers, the periodic CSI configuration by

TABLE 12

| Uplink/Downlink Configuration | Downlink-to-Uplink Switch-point periodicity | subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In other words, a CSI reference resource is the valid downlink frame if it is one of downlink subframes according to TABLE 12.

To allow increasing the window for aperiodic reporting, the definition is further modified as follows: in the time domain, the CSI reference resource is defined by a single higher layers, the number of serving cells configured, the number of subframe subsets configured, the type of reporting (i.e., aperiodic or periodic), and UE capability.

In certain embodiments, the set of valid subframes could be different for the aperiodic CSI and the periodic CSI reporting. In one embodiment, the value of $n_{CQI\_ref\_min}$ is different for the aperiodic CSI and the periodic CSI reporting (i.e., based on the type of reporting).

In embodiment A, if the number of CSI processes configured are less than a threshold, then a first set of valid subframes are used and if the number of CSI processes configured are greater less than a threshold, then a second set of valid subframes are used. In embodiment B, if the number of CSI processes configured is less than a threshold, then a first value of $n_{CQI\_ref\_min}$ is used and if the number of CSI processes configured are greater less than a threshold, then a second value of $n_{CQI\_ref\_min}$ are used.

In the above embodiments A and B, the number of CSI processes can correspond to the following: the number of periodic CSI processes, the number of aperiodic CSI processes, the total number of CSI processes including all the component carriers and the subframe subsets, and the number of CSI processes per component carrier. In certain embodiments, the number of CSI processes in embodiments A and B are based on the maximum number of CSI processes that can be configured in an aperiodic CSI request. For example, the maximum of the number of CSI processes corresponding to the maximum among the first and the second and the third sets configured by higher layers, if the following CSI request field is used in TABLE 13 below.

TABLE 13

| Value of CSI request field | Description |
| --- | --- |
| '00' | No aperiodic CSI report is triggered |
| '01' | Aperiodic CSI report is triggered for a $1^{st}$ set of CSI processes configured by higher layers |
| '10' | Aperiodic CSI report is triggered for a $2^{nd}$ set of CSI processes configured by higher layers |
| '11' | Aperiodic CSI report is triggered for a $3^{rd}$ set of CSI processes configured by higher layers |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
obtaining information on at least one channel state information (CSI) process;
receiving, at a user equipment (UE), a value on a CSI request field in an uplink downlink control information (DCI) format; and
triggering an aperiodic CSI report for a set of CSI processes in response to the value of the CSI request field based on the CSI process information,
wherein the aperiodic CSI report is based on a CSI reference resource,
wherein a CSI reference resource in a time domain for a given CSI process is defined by a downlink subframe $n-n_{CQI\_ref}$, wherein $n_{CQI\_ref}$ is defined based on a downlink subframe associated with the uplink DCI format, and
wherein the at least one CSI process comprises two subframe sets.

2. The method of claim 1, wherein if a number of CSI processes based on the value on the CSI request field exceeds a maximum number of CSI processes, a lowest indexed CSI process is reported.

3. The method of claim 2, wherein at least one set of CSI processes is configured at the UE.

4. The method of claim 1, wherein the $n_{CQI\_ref}$ in the time domain is defined such that the CSI reference resource is in the same valid downlink subframe as the corresponding CSI request in the uplink DCI format.

5. The method of claim 1, wherein all CSI requests other than the lowest indexed CSI process are dropped.

6. A method, comprising:
transmitting a value on a channel state information (CSI) in an uplink downlink control information (DC) format to a user equipment (UE); and
receiving an aperiodic CSI report from the UE corresponding to the value on the CSI request field,
wherein the aperiodic CSI report is based on a CSI reference resource,
wherein a CSI reference resource in a time domain is defined for a downlink subframe $n-n_{CQI\_ref}$, where $n_{CQI\_ref}$ is defined based on a downlink subframe associated with the uplink DCI format, and
wherein the at least one CSI process comprises two subframe sets.

7. The method of claim 6, wherein if a number of CSI processes based on the value on the CSI request field exceeds a maximum number of CSI processes, a lowest indexed CSI process is reported.

8. The method of claim 6, wherein at least one set of CSI processes is configured at.

9. The method of claim 6, wherein in the time domain is defined such that the CSI reference resource is in the same valid downlink subframe as the corresponding CSI request in the uplink DCI format.

10. The method of claim 6, wherein all CSI requests other than the lowest indexed CSI process are dropped.

11. An apparatus, comprising:
a transceiver configured to transmit signals to and receive signals from a user equipment (UE);
a controller configured to
transmit a value on a CSI request field in an uplink DCI format to the terminal, and
receive an aperiodic CSI report corresponding to the value on the CSI request field,
wherein the aperiodic CSI report is based on a CSI reference resource,
wherein a CSI reference resource in a time domain for a given CSI process is defined by a downlink subframe $n-n_{CQI\_ref}$, wherein $n_{CQI\_ref}$ is defined based on a downlink subframe associated with the uplink DCI format, and
wherein the at least one CSI process comprises two subframe sets.

12. The apparatus of claim 11, wherein a number of CSI processes based on the value on the CSI request field exceeds a maximum number of CSI processes, a lowest indexed CSI process is reported.

13. The apparatus of claim 11, wherein at least one set of CSI processes is configured at the UE.

14. The apparatus of claim 11, wherein the $N_{CQI\_ref}$ in the time domain is defined such that the CSI reference resource is in the same valid downlink subframe as the corresponding CSI request in the uplink DCI format.

15. The apparatus of claim 11, wherein all CSI requests other than the lowest indexed CSI process are dropped.

16. An apparatus, comprising:
a transceiver configured to transmit signals to and receive signals from a base station; and
a controller configured to
obtain information on at least one channel state information (CSI) process,
receive a value on a CSI request field in an uplink DCI format,
trigger an aperiodic CSI report for a set of CSI processes in response to the value on the CSI request field based on the information,
wherein the aperiodic CSI report is based on a CSI reference resource,
wherein a CSI reference resource in a time domain for a given CSI process is defined by a downlink subframe $n-n_{CQI\_ref}$, wherein $n_{CQI\_ref}$ is defined based on a downlink subframe associated with the uplink DCI format, and
wherein the at least one CSI process comprises two subframe sets.

17. The apparatus of claim 16, wherein if a number of CSI processes based on the value on the CSI request field exceeds a maximum number of CSI processes, the controller controls the transceiver to report a lowest indexed CSI process.

18. The apparatus of claim 16, wherein at least two sets of CSI processes are configured at the terminal.

19. The apparatus of claim 16, wherein the $n_{CQI\_ref}$ in the time domain is defined such that the CSI reference resource is in the same valid downlink subframe as the corresponding CSI request in the uplink DCI format.

* * * * *